US012681182B2

(12) United States Patent 
Call et al.

(10) Patent No.: US 12,681,182 B2 
(45) Date of Patent: Jul. 14, 2026

(54) SYSTEM AND METHOD FOR AN AIRBORNE MAPPING LIDAR

(71) Applicant: 3DEO, INC., Norwood, MA (US)

(72) Inventors: Brandon R. Call, Orem, UT (US); Dale G. Fried, Dover, MA (US); David Kelley, Norwood, MA (US); Christopher Reichert, Norwood, MA (US)

(73) Assignee: 3DEO, INC., Norwood, MA (US)

( * ) Notice: Subject to any disclaimer, the term of this patent is extended or adjusted under 35 U.S.C. 154(b) by 969 days.

(21) Appl. No.: 17/845,044

(22) Filed: Jun. 21, 2022

(65) Prior Publication Data

US 2022/0404505 A1 Dec. 22, 2022

Related U.S. Application Data

(60) Provisional application No. 63/213,514, filed on Jun. 22, 2021.

(51) Int. Cl.
| | |
|---|---|
| *G01S 17/89* | (2020.01) |
| *G01C 21/16* | (2006.01) |
| *G01S 7/481* | (2006.01) |

(52) U.S. Cl.
CPC .............. *G01S 17/89* (2013.01); *G01C 21/16* (2013.01); *G01S 7/4814* (2013.01); *G01S 7/4817* (2013.01)

(58) Field of Classification Search
CPC ... G01S 17/89; G01S 7/48–51; G01C 11/025; G01C 21/16
See application file for complete search history.

(56) References Cited

U.S. PATENT DOCUMENTS

| | | | |
|---|---|---|---|
| 5,006,721 | A | 4/1991 | Cameron et al. |
| 5,892,575 | A | 4/1999 | Marino |

(Continued)

FOREIGN PATENT DOCUMENTS

| | | |
|---|---|---|
| DE | 112017000127 T5 | 11/2018 |
| JP | 6789926 B2 | 11/2020 |
| KR | 20190112173 A | 10/2019 |

OTHER PUBLICATIONS

Albota et al., "Advanced Three-Dimensional Laser Radar imaging with the Airborne Optical Systems Testbed" Oct. 23, 2018, vol. 89 (10), Rev Sci Instrum. (Year: 2018).*

(Continued)

*Primary Examiner* — Yuqing Xiao 
*Assistant Examiner* — Chia-Ling Chen 
(74) *Attorney, Agent, or Firm* — AKC PATENTS, LLC; Aliki K. Collins

(57) ABSTRACT

A system for generating an image of a region of interest (ROI) from a flying aircraft using a light detection and ranging (lidar) system that includes a transmitter, a receiver, an inertial navigation system, a scanning system, and a system control and a data processing computer. The transmitter includes a pulsed laser. The receiver includes a sensor to detect light scattered and reflected from the ROI. The scanning system uses a field-of-view (FOV) of the transmitter and receiver to interrogate a field-of-regard (FOR) during a flight over the ROI, and the FOV angle is narrower than the FOR angle. The system also includes a software application that divides the ROI into collection unit (CU) areas, and for each CU determines area characteristics, estimates one or more flight paths required to collect CU area data, and determines settings of the sensor for collecting the CU area data.

15 Claims, 14 Drawing Sheets

(56) References Cited

U.S. PATENT DOCUMENTS

| | | | |
|---|---|---|---|
| 9,983,584 B2 | 5/2018 | Bruggemann et al. | |
| 11,364,931 B2 | 6/2022 | Lu et al. | |
| 2003/0036827 A1* | 2/2003 | Murphy | G01S 17/89 |
| | | | 701/3 |
| 2007/0040121 A1* | 2/2007 | Kalayeh | G01S 17/88 |
| | | | 250/342 |
| 2010/0245957 A1 | 9/2010 | Hudman et al. | |
| 2012/0170095 A1* | 7/2012 | Dolleris | G02B 7/1821 |
| | | | 359/212.2 |
| 2015/0029572 A1* | 1/2015 | Vail | G02B 6/3518 |
| | | | 359/223.1 |
| 2018/0164440 A1* | 6/2018 | Fried | G01S 17/90 |
| 2019/0107623 A1* | 4/2019 | Campbell | G01S 7/4865 |
| 2021/0064024 A1* | 3/2021 | Hammond | G01C 21/3415 |

OTHER PUBLICATIONS

Thinal Raj, et al., "A survey of LIDAR Scanning Mechanisms", Electronics 2020, 9, 741.

Hegna, T. et al., "Inexpensive 3-D Laser scanner system based on a galvanometer scan head", International Archives of Photogrammetry, Remote Sensing and Spatial Information Sciences, vol. XXXVIII, Part 5, Commission Symposium, Newcastle upon Tyne, UK, p. 277, 2010.

Golowich, S. et al., "Measurement campaign for hyperspectral imaging in complex illumination environments", Proc. of SPIE 10644, Algorithms and Technologies for Multispectral, Hyperspectral, and Ultraspectral Imagery XXIV, 106441L (May 8, 2018); doi: 10.1117/12.2305200.

* cited by examiner

80

*100*

Lidar System on Aircraft

*125c*

140
Computer

*135b*

130
INS

*135a*

Receiver

124
Camera

*125a*

120

*125d*

150
I/O

*115b*

*115a*

Scanner

110    *113*    *116*

*114*

*112*

*11,1*

Lens

122

*125e*

102
Laser

*145*

*125b*

104
Combining Mirror

Transmitted Light

*106*

Reflected Light

*108*

113

88

88

85

Collection Units

85

88

176

Mapping Region of Interest

Swaths

Collection Units

85

200

200

250

*260*

*270*

SYSTEM AND METHOD FOR AN AIRBORNE MAPPING LIDAR

CROSS REFERENCE TO RELATED CO-PENDING APPLICATIONS

This application claims the benefit of U.S. provisional application Ser. No. 63/213,514 filed on Jun. 22, 2021 and entitled SYSTEM AND METHOD FOR AN AIRBORNE MAPPING LIDAR, which is commonly assigned and the contents of which are expressly incorporated herein by reference.

FIELD OF THE INVENTION

The present invention relates to a system and method for an airborne mapping lidar and in particular to an airborne mapping lidar that includes two separate scanning mirrors.

BACKGROUND OF THE INVENTION

Airborne lidar mapping systems use a laser scanner that is attached to an aircraft during a flight to generate a three-dimensional (3D) model of an object or a scene on the ground. The laser scanner emits a narrow laser beam that illuminates a small region of the ground, which is also simultaneously imaged by one or more light detection pixels, depending on the design of the lidar. In order to collect data over an area on the ground larger than the footprint of the light detection component, the narrow lidar system field-of-view (FOV) is scanned across the scene in a judicious manner. This type of scanning is time-consuming, technically challenging and expensive.

In the context of the airborne lidar system, there is a need for solutions to the problem of scanning the narrow lidar FOV across an intended Region of Interest (ROI) on the ground, at an intended speed, repeating the scan an intended number of times from an intended number of different aircraft locations. There is also a need for a scanning system that has a wide field-of-regard (FOR), i.e., a wide angular area that can be addressed with the scanning system relative to the lidar. Furthermore, there is a need for airborne lidar scanning solutions that operate robustly and predictably, allow maximal flexibility to the operator of the lidar, are cost effective, and utilize expensive aircraft flight time efficiently.

SUMMARY OF THE INVENTION

The present invention relates to a system and method for an airborne mapping lidar and in particular to an airborne mapping lidar that includes two separate scanning mirrors.

In general, in one aspect, the invention features a system for generating an image of a region of interest (ROI) from a flying aircraft using a light detection and ranging (lidar) system. The lidar system includes a transmitter, a receiver, an inertial navigation system, a scanning system, and a system control and a data processing computer. The transmitter includes a pulsed laser. The receiver includes a sensor to detect light scattered and reflected from the ROI. The scanning system uses a field-of-view (FOV) of the transmitter and receiver to interrogate a field-of-regard (FOR) during a flight over the ROI, and the FOV angle is narrower than the FOR angle. The system control and data processing computer includes at least a memory storing computer-executable instructions of a software application and a processor coupled to the memory and configured to execute the computer-executable instructions. The software application includes computer executable instructions that divide the ROI into collection unit (CU) areas, and for each CU determine area characteristics, estimate one or more flight paths required to collect CU area data, and determine settings of the sensor for collecting the CU area data.

Implementations of this aspect of the invention may include one or more of the following features. The lidar system further includes a scheduling application that runs in real time during the flight, a scan controller, and a scan queue that is loosely coupled to the scheduling application and tightly coupled to the scan controller. The scanning system includes a first scanning mirror with a single axis of rotation and a second scanning mirror with a single axis of rotation. The single axis of rotation of the first scanning mirror is non-parallel to the single axis of rotation of the second scanning mirror. The scanning system points the lidar in any direction inside the FOR by moving the first scanning mirror and the second scanning mirror by angles $m_1$ and $m_2$, respectively. The processor executes computer executable instructions of the software application that calculate angles $m_1$ and $m_2$ using:

$$m_1 = -\arctan\left(\frac{u_x + \sqrt{-w_x^2 + u_x^2 + 2u_y^2}}{w_x - u_y\sqrt{2}}\right)$$

$$m_2 = -\xi + \arctan\left(\frac{w_y + \sqrt{-u_z^2 + w_y^2 + w_z^2}}{u_z + w_z}\right)$$

wherein $u_x$, $u_y$, $u_z$ are coordinates of a vector of incoming line of sight of the sensor and $w_x$, $w_y$, $w_z$ are coordinates of a vector of outgoing line of sight. The lidar system further includes a scan controller and the scan controller determines positions of the first and second scanning mirrors and sends command voltages and receives readback voltages to and from an input/output (I/O) device, respectively, in blocks. The I/O device receives and saves blocks of command voltages from the scan controller and generates drive voltages for the first and second scanning mirrors one sample at a time at a fixed rate, and the fixed rate is comparable to a computation rate of the system control and data processing computer. The I/O device samples readback voltages indicating at least one of positions, velocities, and error signals of the first and second scanning mirrors at a sampling rate and saves the readback voltages in blocks and the blocks of the readback voltages are provided to the system control and data processing computer at a lower rate than the sampling rate. The sampling rate is chosen based on the first or second scanning mirrors' acceleration capability so that an angular error between the first or second scanning mirrors' actual position and a calculated position is less than a threshold value. The inertial navigation system is used for time synchronization between the first and second scanning mirror position data and data streams within the system. The collection units may be rectangles, or polygonal areas. The area characteristics may be at least one of terrain elevation profiles, lower envelope of a scene's height, upper envelope of a scene's height, spatial resolution, angular diversity, sampling density, or land cover. The settings of the sensor for collecting the CU area data include at least one of laser power, system photonic link, camera settings, swipe speed, or swipe overlap. The lidar system further includes a scan queue that is loosely coupled to a scheduling application and tightly coupled to a scan controller and the scan queue comprises an ordered data structure of the CU areas and for each CU area includes at least one of a 3D-polygonal boundary in geographic coordinates, a number of times to image the CU area sequentially before choosing another CU area, a total number of times to image the CU area, a value of a swipe angular speed, and a minimum fraction of the CU's area that should be within the FOR in order for the CU area to be scanned. The scan controller is programmed to search the scan queue for a selected CU area that is in view and to send a command to the scanning system to scan the selected CU area for a selected number of scan times and to remove the selected CU area from the scan queue when the selected number of scan times is reached or to add the selected CU area back to the scan queue when the selected number of scan times is not reached. The scan controller calculates a specific motion of the first and second scanning mirrors for scanning a selected CU area by first dividing the CU area into subsection areas (swipes) which are scanned with substantially uniform sampling density, next computing geographic coordinates of a longitude, a latitude, and an altitude, representing beginning and end points of each swipe, next calculating first and second scanning mirror commands to aim at the geographic coordinates, next moving the first and second scanning mirrors to the beginning point of the swipe and moving the first and second scanning mirrors at a substantially constant speed along the swipe and at the end point transitioning to a different swipe until the entire CU area has been scanned. The swipes may be concentric arcs or substantially parallel lines.

In general, in another aspect, the invention features a method for generating an image of a region of interest (ROI) from a flying aircraft including the following. First providing a light detection and ranging (lidar) system that includes a transmitter, a receiver, an inertial navigation system, a scanning system, and a system control and a data processing computer. The transmitter includes a pulsed laser. The receiver includes a sensor to detect light scattered and reflected from the ROI. The scanning system uses a field-of-view (FOV) of the transmitter and receiver to interrogate a field-of-regard (FOR) during a flight over the ROI, and the FOV angle is narrower than the FOR angle. The system control and data processing computer includes at least a memory storing computer-executable instructions of a software application and a processor coupled to the memory and configured to execute the computer-executable instructions. The software application includes computer executable instructions that divide the ROI into collection unit (CU) areas, and for each CU determine area characteristics, estimate one or more flight paths required to collect CU area data, and determine settings of the sensor for collecting the CU area data.

Implementations of this aspect of the invention may include, in addition to the above mentioned implementations, one or more of the following features. The scanning system includes a first scanning mirror with a single axis of rotation and a second scanning mirror with a single axis of rotation. The single axis of rotation of the first scanning mirror is non-parallel to the single axis of rotation of the second scanning mirror. The scanning system orients the lidar in any direction inside the FOR. The scanning system points the lidar toward any direction within the FOR by moving the first scanning mirror and the second scanning mirror to angles $m_1$ and $m_2$, respectively. The processor executes computer executable instructions of the software application that calculate angles $m_1$ and $m_2$ using:

$$m_1 = -\arctan\left(\frac{u_x + \sqrt{-w_x^2 + u_x^2 + 2u_y^2}}{w_x - u_y\sqrt{2}}\right)$$

$$m_2 = -\xi + \arctan\left(\frac{w_y + \sqrt{-u_z^2 + w_y^2 + w_z^2}}{u_z + w_z}\right)$$

wherein $u_x$, $u_y$, $u_z$ are coordinates of a vector of incoming line of sight of the sensor and $w_x$, $w_y$, $w_z$ are coordinates of a vector of outgoing line of sight. The lidar system further includes a scan queue that is loosely coupled to a scheduling application and tightly coupled to a scan controller. The scan queue comprises an ordered data structure of the CU areas and for each CU area comprises at least one of a 3D-polygonal boundary in geographic coordinates, a number of times to image the CU area sequentially before choosing another CU area, a total number of times to image the CU area, a value of a swipe angular speed, and a minimum fraction of the CU's area that should be within the FOR in order for the CU area to be scanned.

Advantages of the invention include one or more of the following. The invention provides a flexible and efficient method for scanning an intended area on the ground, and an apparatus capable of implementing the method. The invention has broad applicability beyond airborne lidar, to lidar on other platforms, such as ground-based, ship-based, or space-based. The invention may also be applied to other scanned optical systems such as spectrometers, microscopes, Near Infrared (NIR) detectors, Shortwave Infrared (SWIR) detectors, Mediumwave Infrared (MWIR) detectors, and Longwave Infrared (LWIR) detectors, among others.

The details of one or more embodiments of the invention are set forth in the accompanying drawings and description below. Other features, objects and advantages of the invention will be apparent from the following description of the preferred embodiments, the drawings and from the claims.

DETAILED DESCRIPTION OF THE INVENTION

The present invention relates to a system and method for an airborne mapping lidar and in particular to an airborne mapping lidar that includes two separate scanning mirrors to efficiently collect lidar data. The invention provides an airborne mapping lidar that combines commercial off-the shelf components to achieve precisely synchronized control and knowledge of the scanning system.

Figure 1:
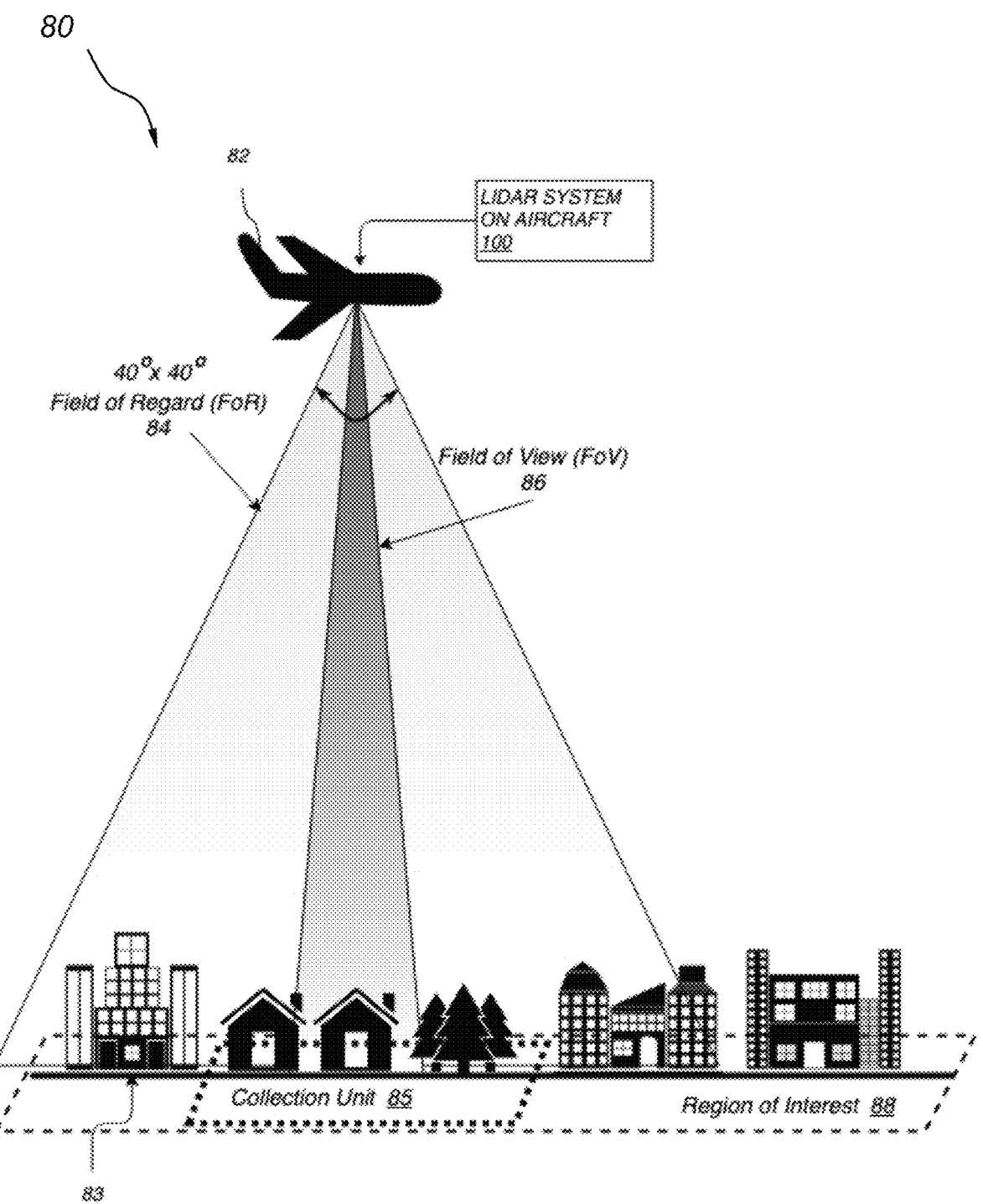
FIG. 1 is a schematic diagram of mapping a region of interest (ROI) using an airborne mapping lidar system.

Referring to FIG. 1, a system 80 for generating an image of a region of interest (ROI) from a flying aircraft 82 includes a light detection and ranging (lidar) system 100 that is installed in the airplane 82 and is used to generate a three-dimensional (3D) model of a region of interest (ROI) 88, or an object 83 or a scene on the ground. The airborne lidar system 100 may also be installed in other airborne platforms, such as helicopters, unmanned aircraft systems (UAS), or balloons, among others. The ROI 88 is divided into collection unit (CU) areas 85. The airborne lidar 100 scans a narrow lidar FOV 86 across the intended Region of Interest (ROI) 88 to sample the objects 83 on the ground in each collection unit 85 at an intended speed and repeats the scan an intended number of times from an intended number of different aircraft locations until the entire ROI is sampled. The angular area that can be addressed with the scanning system relative to the lidar is the field-of-regard (FOR) 84.

Figure 2:
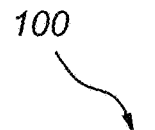
FIG. 2 is a schematic diagram of an airborne mapping lidar system, according to this invention.

Referring to FIG. 2, an airborne lidar system 100 according to this invention includes a laser transmitter 102, a receiver 120, a scanner 110, an Inertial Navigation System (INS) 130, and a system control and data recording computer 140. The laser transmitter 102 includes a laser, beam shaping optics, shutters, and attenuators. The receiver 124 includes electronic light detection devices 124, and components 122 that collect light and focus it onto the electronic light detection devices. The electronic light detection devices 124 may be Avalanche Photodiodes (APD's), Photomultiplier Tubes (PMT's), Micro-Channel Plate detectors (MCP's), and derivatives thereof, such as a focal plane array of APD's comprising a camera. The scanner 110 includes components that steer and scan the outgoing and incoming light beams, such as prism wedges, spinning polygonal mirrors, and oscillating flat mirrors, among others. The INS 130 includes components that are used to measure the position and orientation of the lidar system, such as a Global Positioning System (GPS) receiver and an inertial measurement unit, among others. The system control and data recording computer 140 controls the scanning process, the behavior of the system and records the data streams from the various sensors.

As was mentioned above, lidar 100 actively illuminates a scene 88 with a laser beam and performs thousands or millions of range measurements per second along the vector from the lidar sensor to points on the ground. These range measurements are combined with the platform position data and are used to calculate survey measurements of the latitude, longitude, and elevation of the surfaces on the ground that are illuminated by the laser beam. A core figure of merit of the lidar system is the rate at which these measurements are executed.

The data that are collected with an airborne lidar system include parameters such as the region to be collected, typically called the Region of Interest (ROI), the desired density and uniformity of survey points on the ground in the final product delivered to the customer, the desired accuracy of the data product in both horizontal and vertical directions, and the desired amount of angle diversity to utilize in the collection, among others.

It is desirable that the scanning system 110 has a wide FOR 84. This enables wide angle diversity, by allowing the aircraft to interrogate the ROI 88 from many different locations near or far from the point directly overhead the ROI 88. A wide FOR 84 also allows repeated interrogations of the ROI 88 as the aircraft 82 flies overhead. A wide FOR 84 also allows compensation for non-ideal positions and orientations of the aircraft 82 during the collection, which is usually unavoidable.

It is desirable that the scanning system 110 is able to point accurately and slew quickly to anywhere within the FOR 84. This ability to point accurately and slew quickly within the FOR 84 enables concentration of the finite measurement rate of the lidar sensor on just the (perhaps irregularly-shaped) ROI 88, thereby using expensive flight time efficiently. This also enables rapid re-interrogation of the ROI 88, to achieve significant angular diversity on a single flight pass, and fast, uniform scanning, to spread out the measurement rate of the lidar evenly across the ROI 88.

Figure 3:
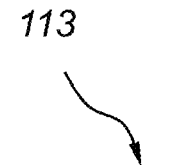
FIG. 3 is an example of a scanning system with two separate mirrors used in the airborne mapping lidar of FIG. 2.
Figure 3:
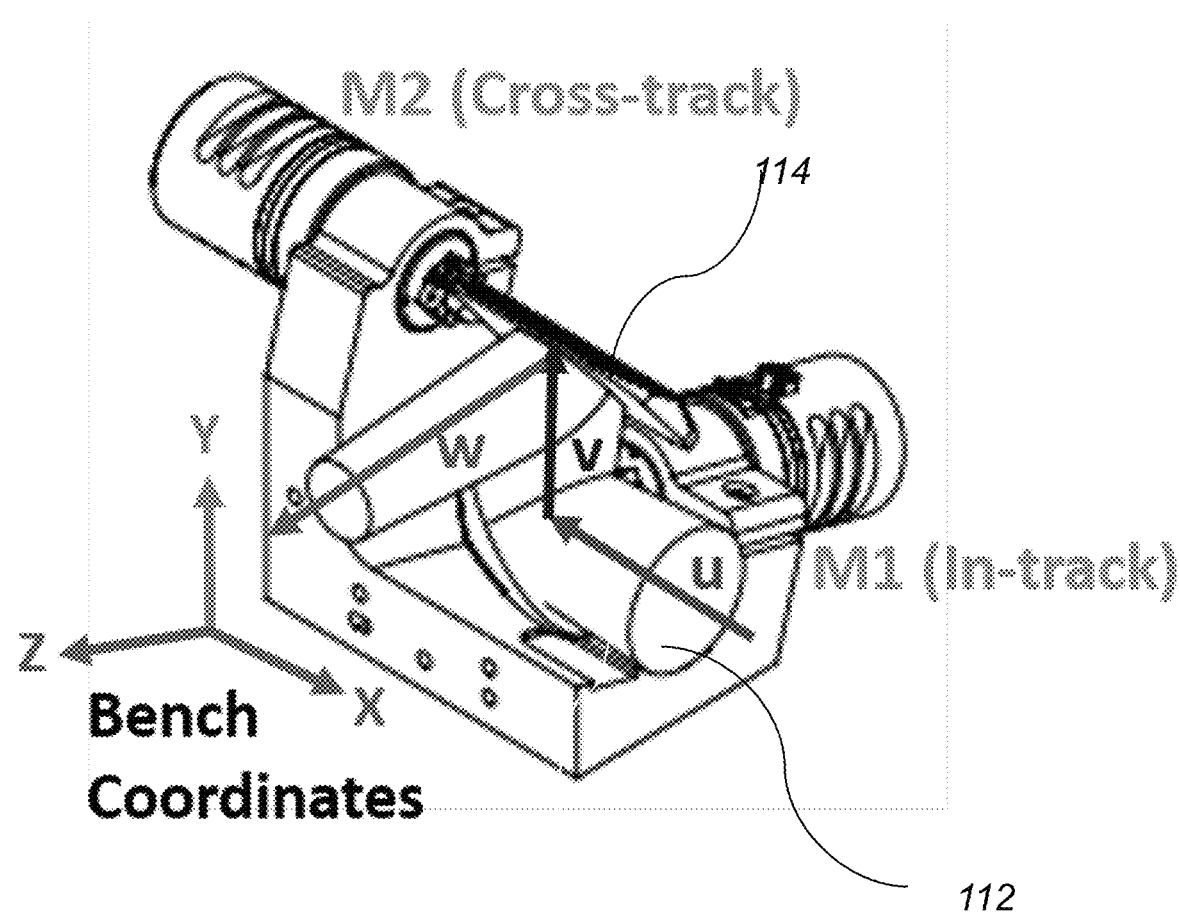
Figure 4:
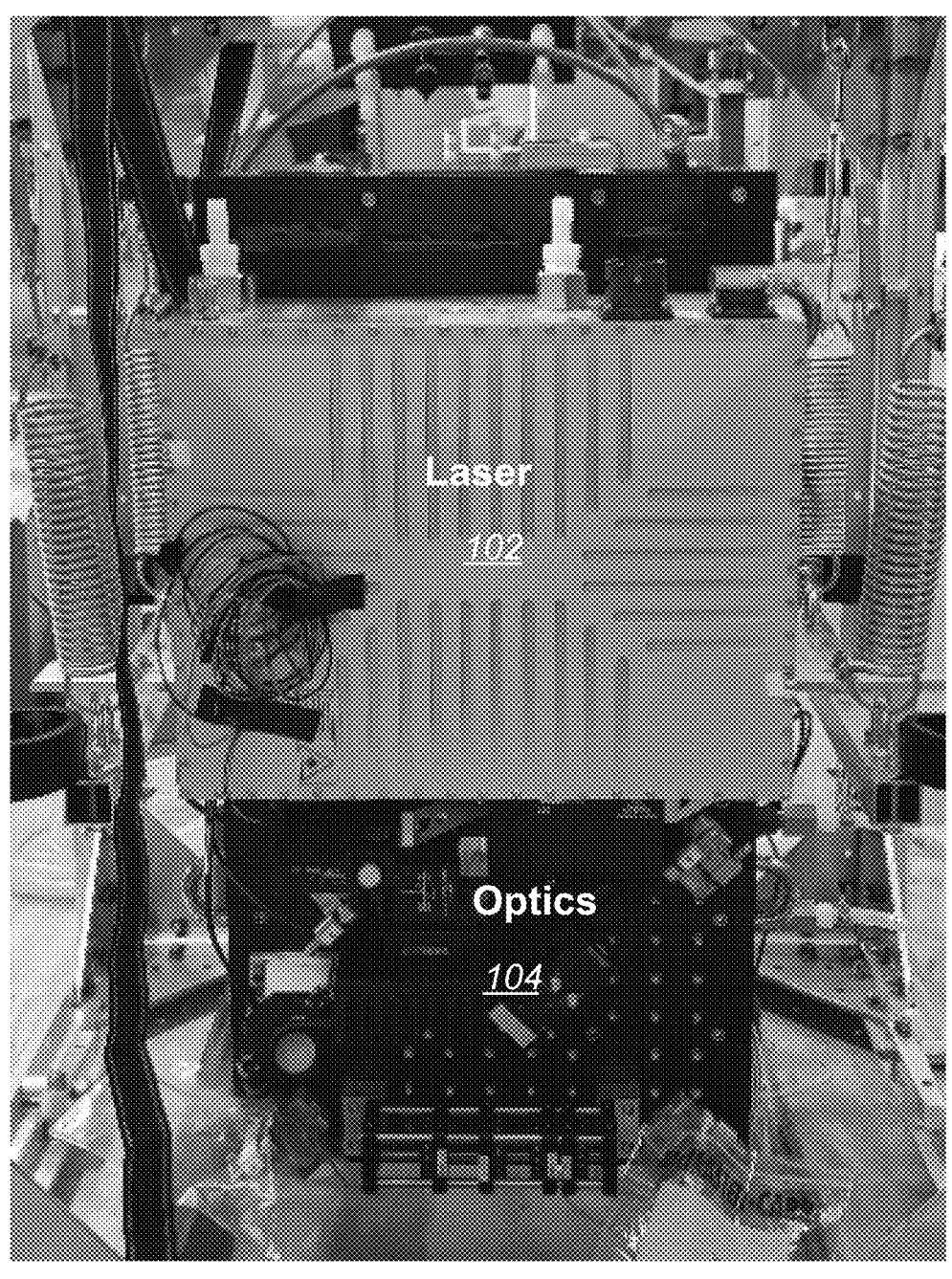
FIG. 4 depicts the laser and the optical components used in the airborne mapping lidar system of FIG. 2.
Figure 5:
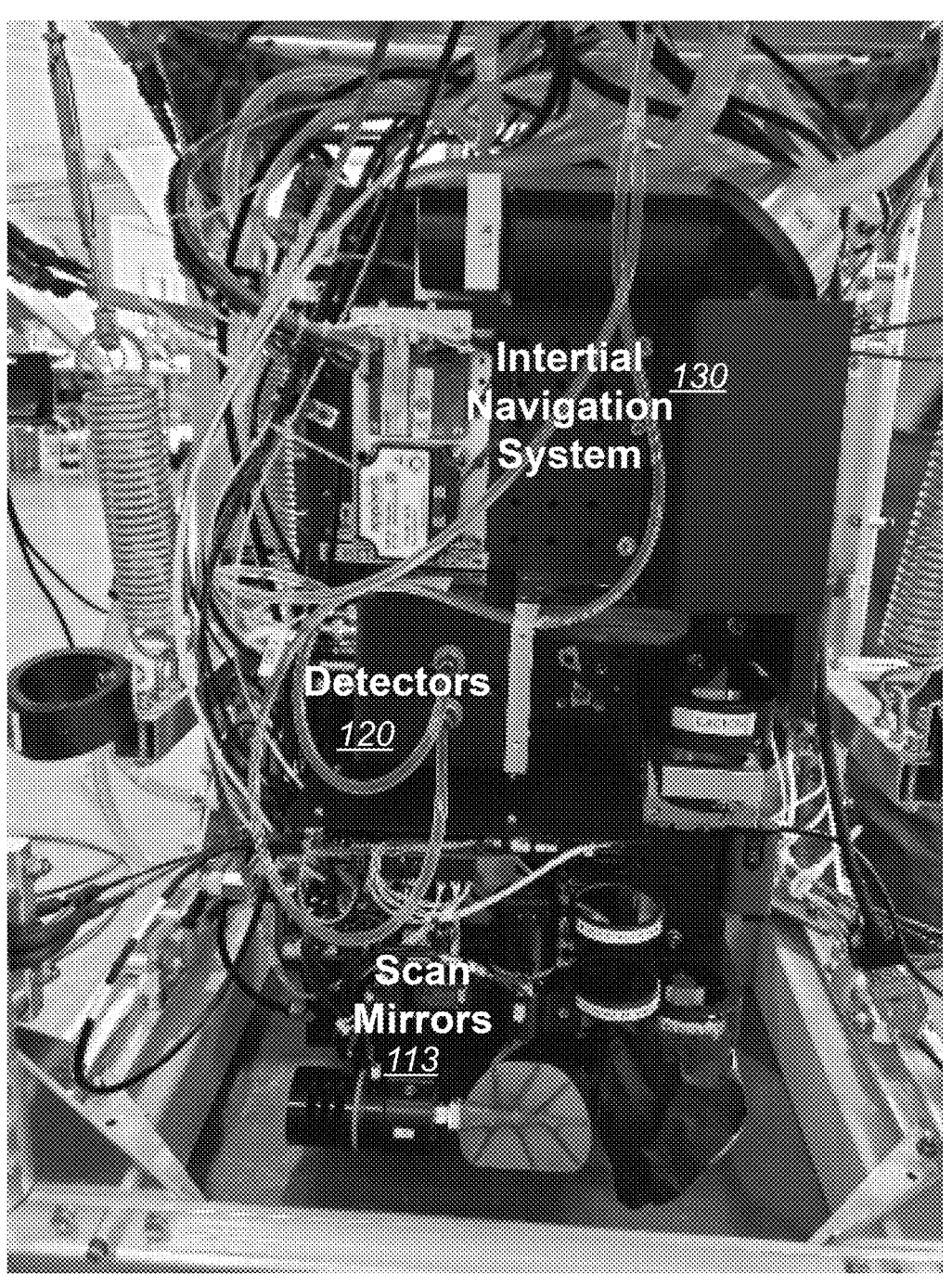
FIG. 5 depicts the inertial navigation system (INS), the camera with the incorporated detectors and the scanning mirrors used in the airborne mapping lidar of FIG. 2.

Referring to FIG. 2 and FIG. 3, the lidar system 100 of this invention uses a scanning system 110 that includes two separate scan mirrors 112, 114, each with a single axis of rotation 111, 116, respectively. In this embodiment, axes 111, 116 are oriented perpendicular to each other. In other embodiments, axes 111, 116 are oriented at an angle other than zero degrees, so that they are not parallel to each other. The two mirror scanning system 110 enables the lidar system 100 to point in any direction inside the FOR 84 that is addressable by these two mirrors. The present invention also provides a unique method for moving these two mirrors 112, 114 so as to achieve scanning that enables efficient lidar imagery collection. In one example, the scanning system orients the lidar toward any direction within the FOR by moving the first scanning mirror and the second scanning mirror by angles $m_1$ and $m_2$, respectively. Angles $m_1$ and $m_2$ are calculated using the following equations as described in Appendix A:

$$m_1 = -\arctan\left(\frac{u_x + \sqrt{-w_x^2 + u_x^2 + 2u_y^2}}{w_x - u_y\sqrt{2}}\right)$$

$$m_2 = -\xi + \arctan\left(\frac{w_y + \sqrt{-u_z^2 + w_y^2 + w_z^2}}{u_z + w_z}\right)$$

wherein $u_x$, $u_y$, $u_z$ are coordinates of a vector u of the incoming line of sight onto the scanning system, $w_x$, $w_y$, $w_z$ are coordinates of a vector w of the desired outgoing line of sight and $\xi$ is the zero position angle of the second mirror relative to the mirror assembly coordinate system. Vector u is the incoming camera (sensor) light of sight, vector v is the path between the two mirrors, and vector w is the desired line of sight from the center of the second mirror 114 to the target location on the ground in mirror assembly coordinates, as shown in FIG. 3. The two separate mirrors 112, 114 are flat and are driven by electric motors (galvanometers). The range of motion of the lidar line of sight (LOS) is chosen wide enough so that the lidar system can efficiently collect signals from the vertical surfaces on the sides of buildings, while also allowing the system to collect close to vertical so as to see deep into urban canyons. In one example the range of motion of the LOS is ±20 degrees. There is a significant cost for very wide ranges of motion as size of the mirror face must be made substantially larger than the receiver clear aperture (with attendant complications). The utility is also limited as shadowing effects on the ground become more substantial as the LOS is tilted further away from nadir. In one embodiment the scanning system is arranged so that the center of the FOR 84 is tilted 15 degrees to the left-hand side of the aircraft. This enables a system FOR 84 of ±20 degrees along-track (parallel to the direction of flight), and 35 degrees left to 5 degrees right in the across-track direction (perpendicular to the direction of flight). The dynamic capability of the mirror is also important. In one embodiment the mirrors 112, 114 support a clear aperture of 4 cm over most of the range of motion and accelerate fast enough so that minimal time is spent in turnarounds. The accuracy and repeatability of the position readback is also critical to the overall accuracy of the system. In one example, the two-mirror assembly 113 used in the present embodiment is model QS45XY-AG manufactured by Thorlabs. The angular position of each mirror 112, 114 is sensed by an analog encoder, which produces an analog voltage corresponding to the position of the mirror. The analog voltage is converted to a digital signal using a high-speed analog to digital converter circuit board described in the next section. The data are recorded to removable media for post-processing.

The lidar system 100 of this invention uses the inertial navigation system (INS) 130 to measure the lidar's position and orientation on the earth. In one example, the INS is model APX-20 manufactured by Applanix. The inertial navigation system 130 combines measurements from an inertial measurement unit and one or more GPS antennas to compute a best-estimate solution of the lidar system's state, including position, orientation, velocity, and angular rates, among others. Examples of an inertial measurement unit include angle rate sensors, magnetometers, gyroscopes, accelerometers and combinations thereof. The lidar system's state information is sent to the computer 140 and is also recorded to removable media. The lidar sensor range measurements are recorded from a Geiger-mode camera 124. Each pixel in the camera records a timestamp for each photon that is detected. The time is then converted to range. The mirror positions, lidar attitude and position, and lidar range measurements are synchronized in post processing and used to make a 3D point cloud representing the real-world objects that are measured.

The lidar system 100 of this invention uses a computing system 140 to run the scanning software that controls the behavior of the system and records the data streams from the various sensors. In one example, computing system 140 is a commercial off-the shelf (COTS) PCIe/104 format computer with a quad core Intel i5 processor and 8 GB of RAM (model ADLQM87PC). The computer 140 connects via USB 125c to a high-speed digital I/O data acquisition device 150 (model USB-1608GX-2AO-OEM) capable of digital I/O, analog input and analog output. The I/O device 150 has the capability to convert individual analog input and output channels at 500 k samples per second. It has 2 analog output channels and 8 analog input channels. The I/O 150 device is connected (115a, 115b) to the scan mirror unit 110 which is controlled by analog voltages. The I/O 150 device is connected to the control computer 140 via a USB 2.0 connection 135a. The control computer 140 also has a mini PCIe timing card 145 to enable synchronization between the mirror system and the scanning system. The computer 140 also communicates with the INS via Ethernet connection 135b and this information is used to compute geo-referenced pointing.

A problem encountered using a low-cost COTS I/O device 150 is real-time control of the scanning system. The mirrors 112, 114 must be moved in a smooth manner that is tightly coordinated with the position and orientation of the aircraft, and also coordinated with the control of the camera. This control requires the command voltages for the mirror positions to be fed at a consistent rate. The timely calculation of the intended command voltages requires predictable scheduling of CPU resources. In order to minimize the CPU resources devoted to the overhead of servicing interrupts, the command voltages and readback voltages are communicated to the analog I/O device 150 in blocks. A block of new commands is computed as a group and then sent to the I/O device. The I/O device saves the block of commands and generates drive voltages for the mirror one sample at a time at a fixed rate. In this way the I/O device 150 can communicate with the mirrors 112, 114 at a high and smooth rate while the computer software does not have to incur loop, computation and communication overhead at a high rate. The mirror command rate is 50 k samples per second per mirror. This rate was chosen to be at least 10× higher than the small signal step response time of the mirror and is well within the capability of the CPU resources and I/O device buffer sizes. The same strategy is used for mirror position readback. The I/O device 150 samples the voltages indicating two mirror positions, two mirror velocities, two mirror error signals, one reference voltage and one timing signal at 12.5 k samples per second per channel. These samples are accumulated by the I/O device and provided in blocks to the software at a lower rate. The software writes these blocks to digital storage for use in processing later. The sampling rate is chosen based on the acceleration capability of the mirror so that the angular error between the actual mirror position and the position that could be inferred by an n-degree polynomial fit to the (n+1) measured points nearest in time to a given instant is less than a threshold value. In the present embodiment n=2 and the threshold angular error is 30 microradians.

Figure 10:
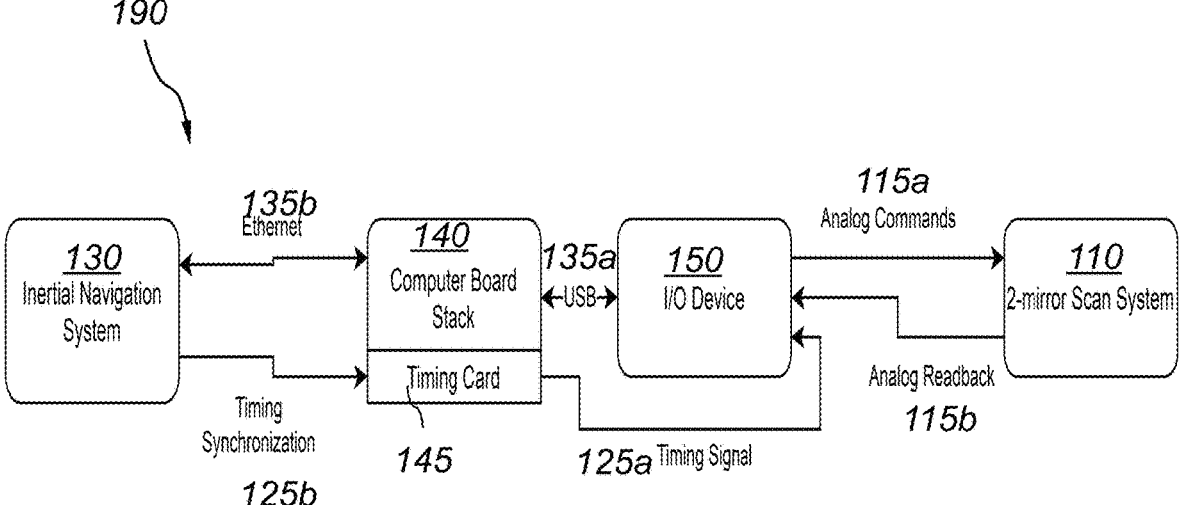
FIG. 10 is a block diagram of the scanning system hardware.
Figure 11:
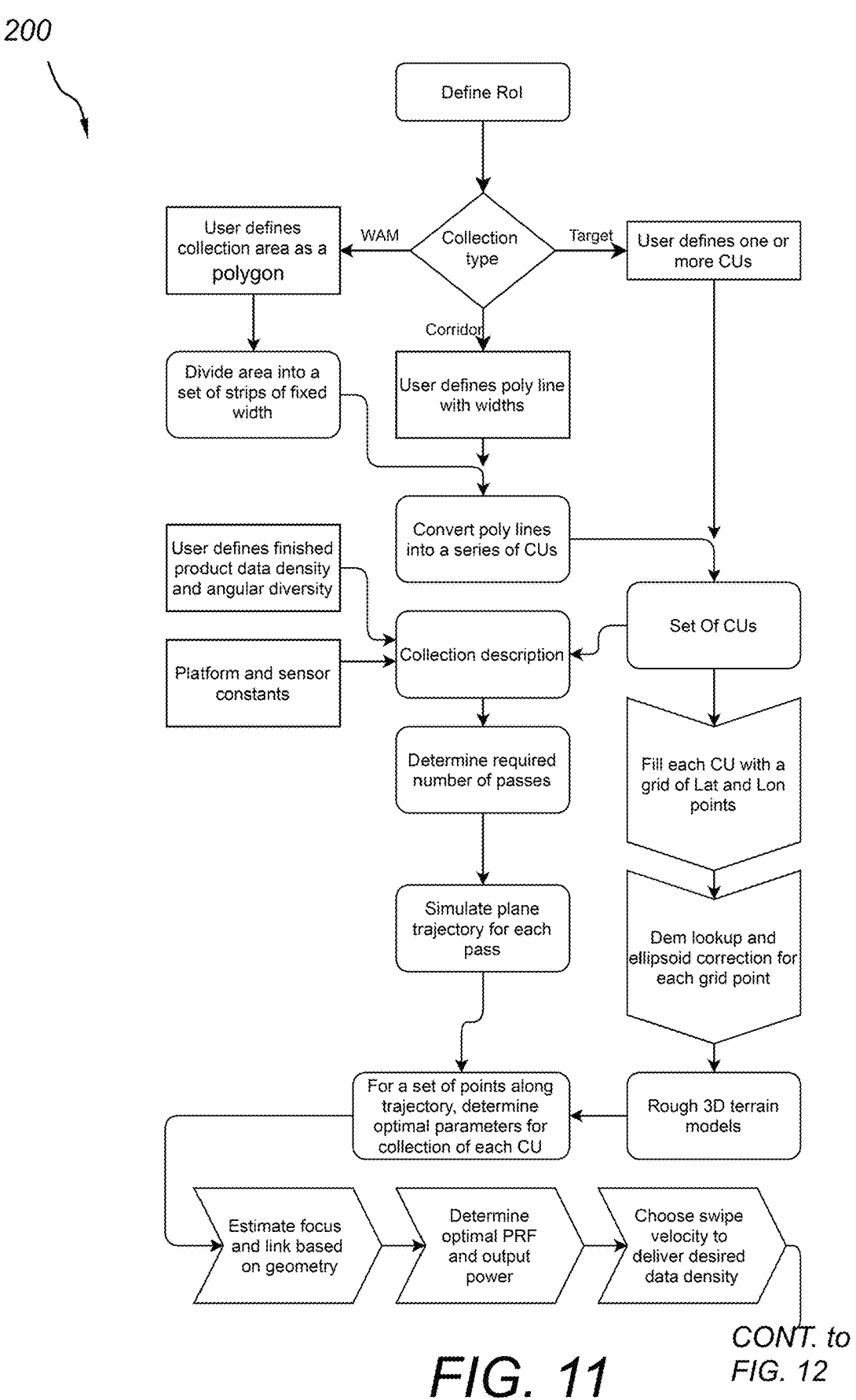
FIG. 11 and FIG. 12 are flow diagrams for the mission planning and scanning according to this invention.

The inertial navigation system 130 is the master of time synchronization because it is connected to the GPS network and has the most accurate absolute time. The mini PCIe timing card (model Syncclock32 mPCIe) 145 receives a one pulse per second (1PPS) low-jitter synchronization signal 125b from the inertial navigation system 130, as shown in FIG. 10 and FIG. 2. The computer 140 receives an absolute time stamp via Ethernet 135b and sets the absolute time on the timing card 145. The timing card 145 creates a 989 Hz timing synchronization pulse 125a which is sent to the I/O device 150. The I/O device 150 reads this timing signal 125a on an analog channel in sequence with the other analog signals. The computer 140 receives an interrupt message 125d from the timing card 145 for each pulse and records the absolute time for each pulse. The method for using these information streams to synchronize the mirror position data to the other data streams is described below.

Objectives for Scanning

For a given lidar data collection project, several objectives should be met simultaneously. The relative priority of the objectives depends on the project. The method of the present invention allows these objectives to be met efficiently. These objectives include the following:

Achieve the intended average sampling density across the scene, including extra sampling in pre-defined regions if so desired;

Achieve uniformity of sampling across the scene;

Achieve the intended level of angle diversity, typically with wide separation between interrogation angles;

Minimize time spent pointing outside of the ROI;

Collect multiple overlapping or non-overlapping ROI's that are close together.

In order to achieve a desired density of points on the ground in the final data product (AKA point density), a minimum desired sampling density is identified during the planning phase of the data collection. This is the desired number of times that a pixel in the receiver is exposed to a laser pulse illuminating the ground, per unit area. The sampling density required to meet the necessary point density depends on assumptions about the scene reflectivity and geometric complexity. The concept is generalized to account for the non-uniform illumination of the detector array by the laser beam, the non-uniform photon detection efficiency of the detector array pixels, and the time-varying photonic link that depends on the range to the target. If the sampling density is too low, there are not enough measurement attempts made to reliably detect the surfaces in the scene, and image quality suffers. The area collection rate of the system is inversely proportional to the sampling density, so if the system is operated at higher sampling density than necessary the area collection rate is compromised and the data collection process takes more time, often incurring extra costs. The image quality is often not appreciably improved by sampling densities higher than a threshold. To collect the desired image quality efficiently, the lidar system needs to be able to reliably achieve the sampling density desired for the projects' intended purpose.

In most cases the ground should be sampled at perfectly uniform density, meaning that each region of the ground would be interrogated the same number of times. In practice this is not possible but scanning motions can be designed to achieve sampling uniformity that approaches the ideal case. In some situations, characteristics of the ROI are known during the planning phase that indicate a higher or lower sampling density should be used in particular subregions of the ROI. This might occur, for example, if a large field of grass (with high reflectivity) and a large black parking lot (low reflectivity) are both present. One could design a collection to increase the sampling density on the parking lot so as to achieve the minimum product point density on the parking lot without wasting extra time on the grassy area. The method of the current invention accommodates this possibility.

Angle diversity refers to the number of different viewing geometries that are used in the complete process of interrogating the scene and the angular distance between them. Angle diversity is critical in allowing a lidar system to create a more complete model of a complex scene. For example, sides of a building that are shadowed when the building is viewed from one point may be observable when viewed from a different point on the other side of the building. Also, objects under forest canopy and other partial obscurants can be successfully imaged by probing the object through many different points in the canopy overhead, finding a hole on at least one of the times the object is probed. In order to achieve interrogation angle diversity, the scene must be scanned from multiple different aircraft locations. Typically, these different viewpoints should be far apart from each other. Survey measurements collected seconds, hours, or days apart can be combined into a single coherent whole so long as the scene did not change over the course of the measurement process.

Rapid and efficient data collection is important due to the high cost of aircraft flight time, equipment rental, and labor. In disaster relief and military operations there are non-pecuniary reasons for faster data collections. The current invention references the scanning activity to the intended location on the ground, independent of the position and orientation of the aircraft, maximizing the time spent scanning the ROI and thus the collection efficiency. For example, as the aircraft approaches the ROI the scanning begins as soon as any significant part of the ROI is within the sensor FOR. Irregular shapes are scanned as defined during the planning process, ensuring uniform sampling of the specified ROI.

In some collection scenarios there are multiple ROIs located near each other. This might occur, for example, when an electric utility substation is situated adjacent to a power line corridor, or when two halves of a large highway are separated by an extra-wide median that does not need to be scanned. The system interrogates the multiple ROIs with the intended sampling density and uniformity, with the desired minimum angle diversity, as efficiently as possible.

Method of Scanning

A general-purpose framework is implemented to accomplish all of the above mentioned scan goals. The framework includes the following components:

Mission planning tool that defines how the ROI is divided into Collection Units (CUs).

Scheduling tool that runs in real time during the flight.

Scan queue that is loosely coupled to the scheduler and tightly coupled to the scan controller Scan controller that determines the mirror position commands and sends them to the I/O module.

There is a significant benefit to operations with a scan scheduling tool that is loosely coupled to a scan queue, which is in turn tightly coupled to the scan controller. Tightly coupling the scan queue to the scan controller means that the scan controller is always doing something useful. It uses instantaneous geospatial information to target CUs that are in view, so that time is not spent targeting inaccessible CUs. This also allows effective scanning of small targets, which can be scanned in tens of milliseconds. Loosely coupling the scheduler to the queue means that the system can incorporate complex calculations, looking many seconds into the future to optimize e.g., the angular diversity of the final data product. This also allows the scheduler to estimate data density during collections and adjust the queue accordingly to maintain data quality as conditions change. This scheduling system allows collections of large areas, complex shapes, and data with variable levels of point density.

Figure 12:
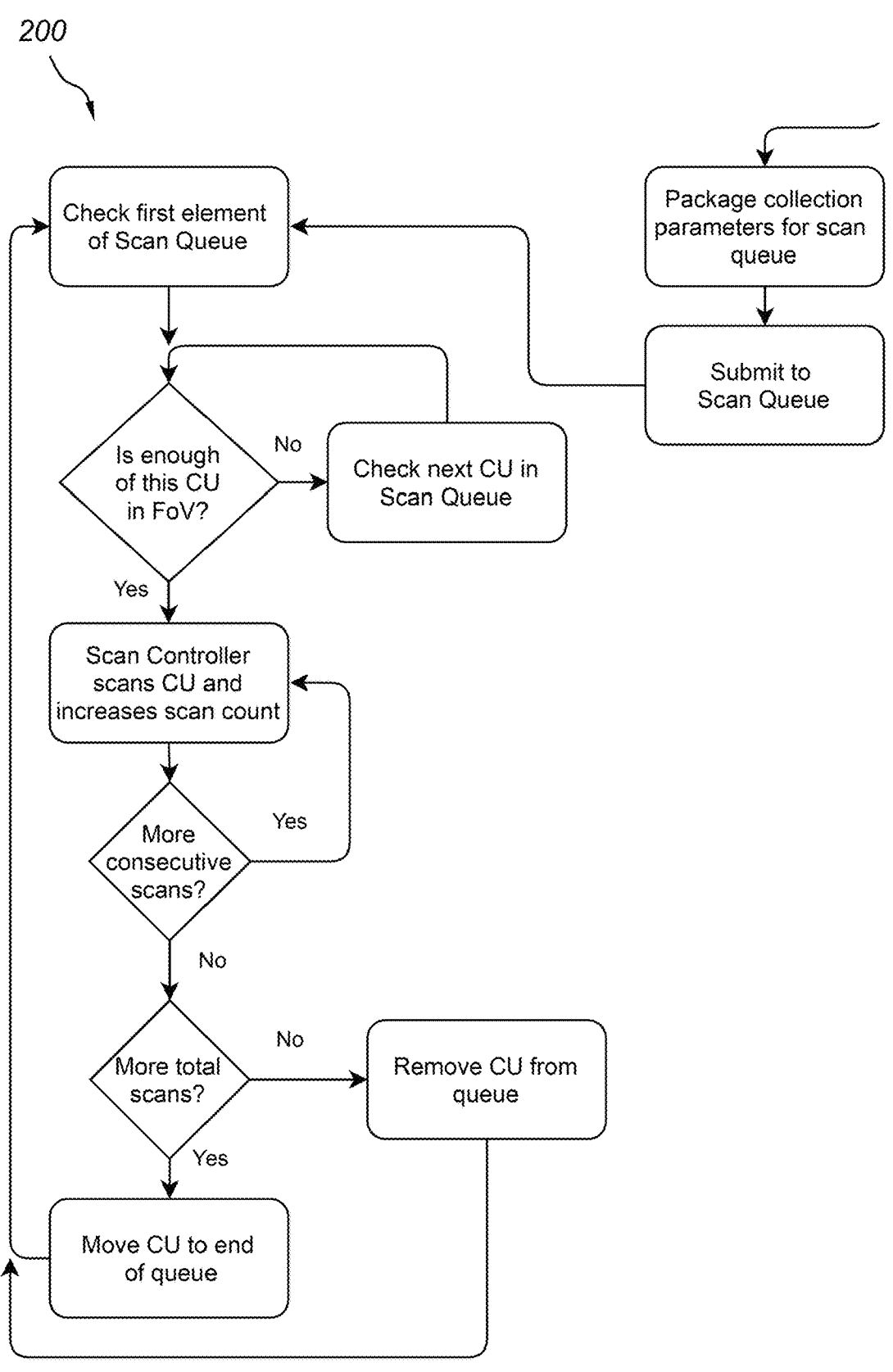
Figure 13:
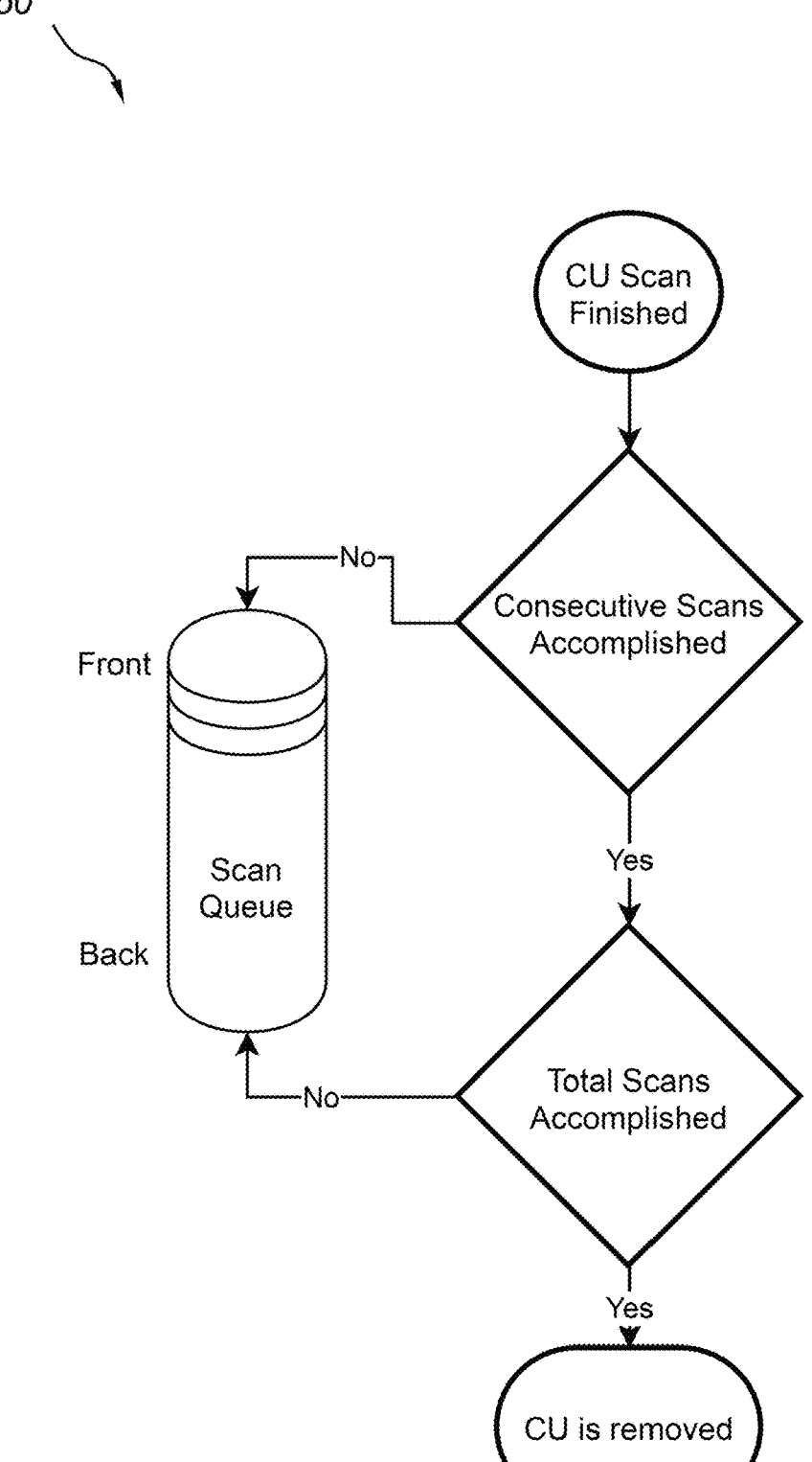
FIG. 13 is a flow diagram of the scan queue.

The planning tools and process and the steps of the scanning process 200 are described with reference to the flowcharts of FIG. 11, FIG. 12, FIG. 13, FIG. 14, and FIG. 15. The planning process involves collecting user input about the collection units (i.e., rectangles, polygons, or any 2D or 3D polygonal areas or volumes) and converting this information into scans which are then fed into the scan queue. The scan controller then parses through the scan queue and scans the collection units which meet the criteria for scanning. When a scan of a current collection unit is finished, the flow chart of FIG. 13 is used to decide if and how the scanned collection unit is added back into the scan queue. The next collection unit to be scanned is then the next collection unit at the top of the queue that is in view.

Figure 14:
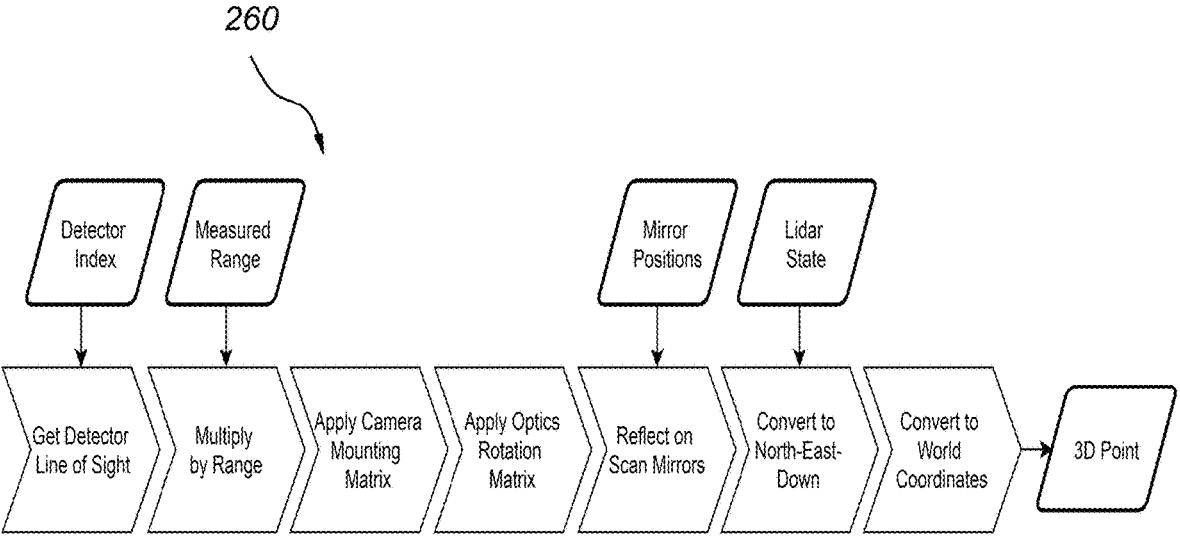
FIG. 14 is a block diagram for the data post processing transform.

All data streams and measurements are recorded to a disk for post-processing or on-board processing. The first step of the processing is to transform the raw range measurements into 3D world points. The block diagram of FIG. 14 depicts the steps in the transform process.

Figure 15:
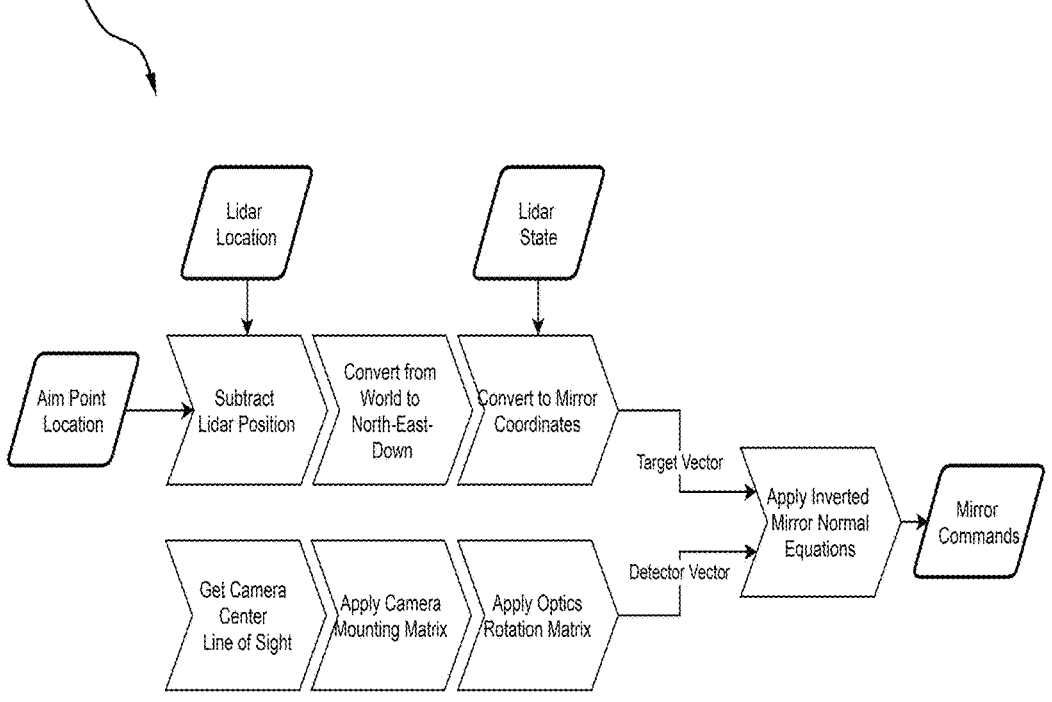
FIG. 15 is a block diagram for the mirror control algorithm.

FIG. 15 is block diagram that shows how scan mirror commands are computed. The camera's central line-of-sight vector and the vector from the lidar system to the target are converted into mirror coordinates. Then the Inverted Mirror Normal Equations are used to compute the mirror angles that will reflect the camera line of sight into the target line of sight.

Mission Planning Tool.

Input is a quantitative description of the imaging task and a specification of the area or volume to be collected, provided for example in geographic coordinates and elevation.

The quantitative description includes a desired minimum point density in the final product, required spatial resolution, and desired angle diversity. Constraints related to aircraft operations might also be included, such as minimum and maximum flight altitudes and speeds.

Figure 7:
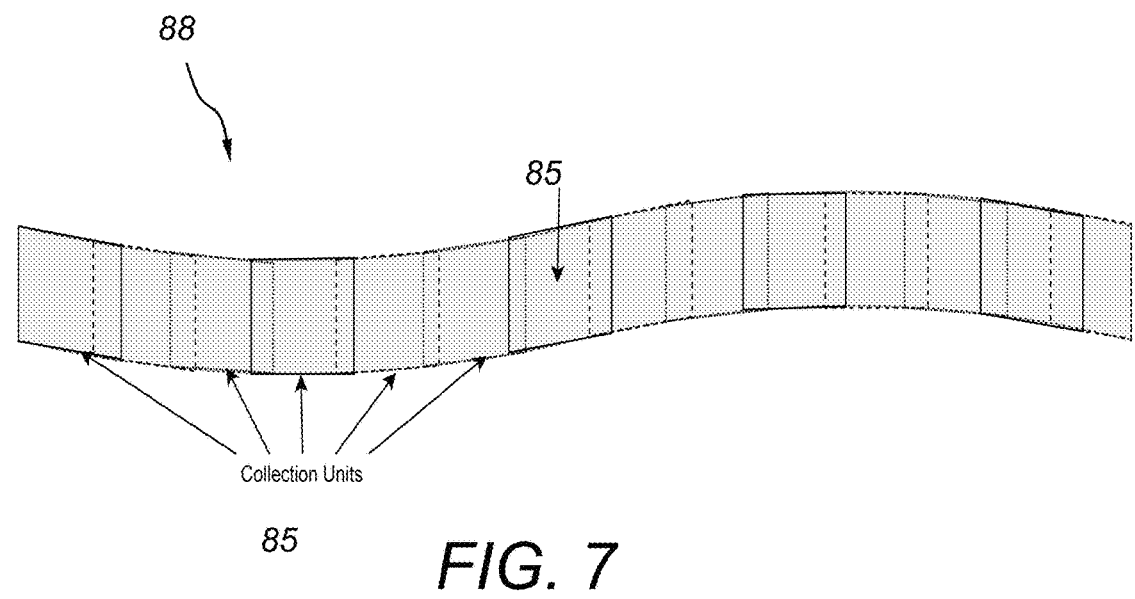
FIG. 7 depicts a corridor-shaped region of interest.
Figure 8:
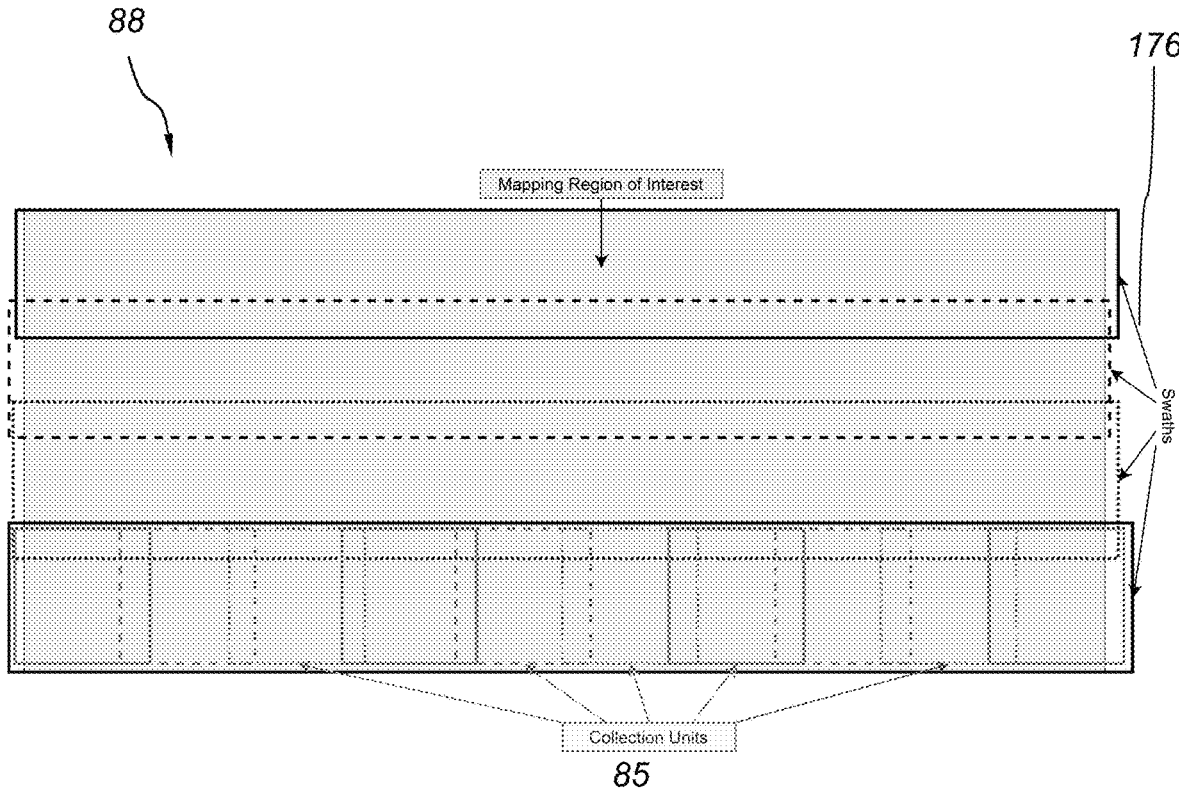
FIG. 8 depicts a large area region of interest, broken into swaths and collection units.

The planning tool divides the ROI 88 of the project into a set of smaller areas to collect, called Collection Units (CUs) 85, as shown in FIG. 7 and FIG. 8. For each CU 85 the planner determines characteristics of the area (such as terrain elevation profiles, heights of buildings, land cover, among others), estimates one or more flight paths required to collect the area, and determines optimal settings of the lidar sensor for collection of that area (for example laser power, camera settings, swipe speed, swipe overlap, among others). The collection units 85 may be of various sizes and shapes.

Figure 6:
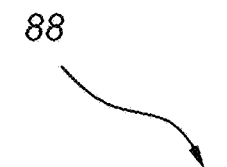
FIG. 6 is a schematic diagram of multiple regions of interest, two of which overlap spatially.
Figure 6:
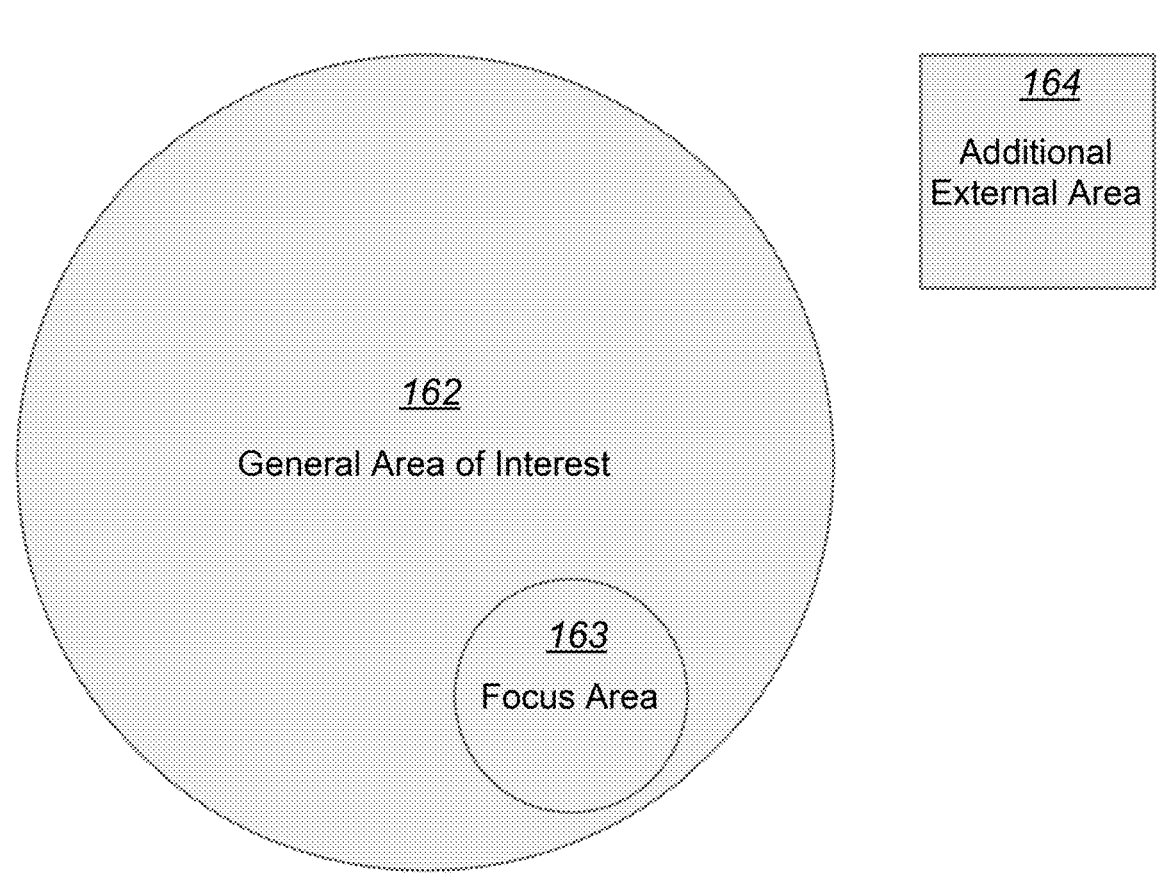

If a region of interest 88 includes more than one areas of interest 162, 163, 164, each area of interest is considered a separate collection unit 85 and added to the scan queue separately, as shown in FIG. 6. Some sub-areas 163 may require more interrogation due to terrain type, scene type or presence of ground control points. These sub-areas can be made into separate collection units with collection parameters chosen to achieve better imagery for that sub-area. The scanning system alternates between areas during a single pass.

In some embodiments, the region of interest 88 may be a long, corridor-shaped area like the area around a road, trail, track, power line or river, as shown in FIG. 7. In this case the region of interest is divided into successive collection units 85 and the units are added to the queue. Each collection unit 85 is scanned multiple times as the platform flies near the region of interest to achieve angular diversity. Collection units 85 overlap to help with angular diversity, ensured coverage and image alignment. The collection units shown here are the same general shape and size, but they may be differing size and shape including different widths and have any number of vertices.

When the region of interest 88 is too large to collect in one pass of the lidar system, the region is divided into swaths 176 that are narrow enough to be collected in one pass, as shown in FIG. 8. Swaths 176 are placed with overlap on other swaths for angular diversity, ensured coverage and image alignment. Each swath 176 is further divided into collection units 85 in a similar way as the corridor mode.

Figure 9:
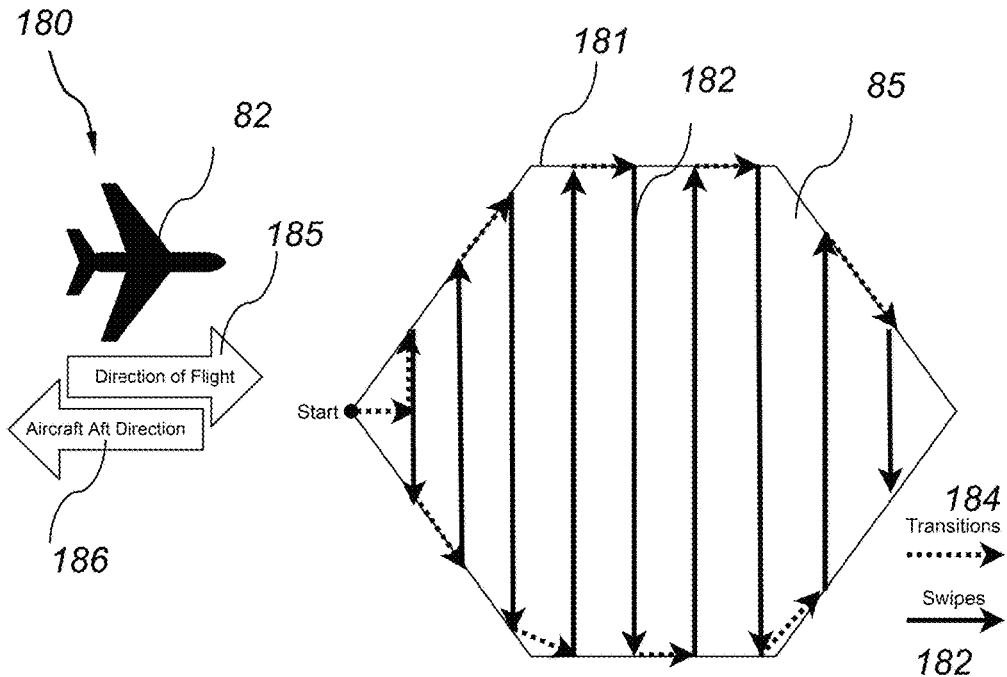
FIG. 9 depicts a scanning swipe diagram for a collection unit.

FIG. 9 shows how scan swipes 182 are laid out across an arbitrary collection unit 85 in order to achieve high sampling uniformity. The spacing between swipes is held to a constant angular value across the polygon and is the size of a fraction of the detector array. In one embodiment, the start point is chosen as the farthest aft point, however any boundary point can be chosen. The swipes can proceed across the collection unit in any direction as long as the direction remains consistent for the duration of the scan.

Scheduling Tool

Input are the pre-planned characteristics of the collection and the real-time information about aircraft position, flight path and speed, and sensor performance (such as indications of atmospheric attenuation). The scheduler runs in real time during the flight with optional operator input. It chooses CUs to put into or remove from the scan queue. It can modulate the pre-planned swipe speed and swipe overlap in response to real-time observations of sensor performance. It can also accommodate input from on-board processing systems which can indicate sub-regions that are likely to need extra sampling density due to scene complexity or partial obscurations.

Scan Queue

The scan queue is an ordered data structure. The Scan Controller searches for, and scans, the first CU 85 in the queue that meets the requirements described in this section. Each entry in the scan queue describes a CU 85, and includes parameters such as the following:

A 3D polygonal boundary 181, in geographic coordinates;
A number of times to image the CU sequentially before choosing another CU 182;
A total number of times to image the CU (or unlimited);
A value for the swipe angular speed; and
The required minimum fraction of the CU's area that should be within the FOR in order for the CU to get scanned.

The scan queue is used as follows and as shown in the flowchart in FIG. 12:

The Scan Controller searches from the front of the Scan Queue for the first CU that is suitably in view. The fraction of the area of the CU that is currently within the sensor FOR should exceed the required minimum fraction specified for that CU.

The scan controller generates and sends the commands to the scan mirrors to execute a scan of the chosen CU.

When the scan is complete, a tally of the total number of times the CU has been scanned is incremented.

If the CU has remaining sequential scans, the CU is left at the top of the queue to be rescanned.

Otherwise, if the CU has been imaged the total required number of times, it is removed from the queue and discarded. The total number of times a CU must be scanned can be unlimited.

Otherwise, the CU is moved to the back of the queue.

The Scan Controller searches again from the front of the Scan Queue for the next CU.

The Scan Controller

The Scan Controller calculates the specific motion required of the scan mirrors in order to effectuate the scan behavior described by the current entry in the scan queue, given the current position and attitude state of the lidar sensor.

In one embodiment, the specific motion of the mirrors for a given scan of a given CU is computed as follows and is shown in FIG. 9.

The farthest aft boundary point is selected as the starting point. The aft direction is in reference to the heading of the platform and is in the direction of the tail of the platform. The idea of "farthest" is relative to the other boundary points and not the platform (1).

A line of infinite length and a heading perpendicular to the airplane heading is placed forward of the starting point by a distance relative to the sensor characteristics. This line is two-dimensional and represented in the local tangent plane centered at the starting point. The distance forward is (1−f)×Nx×a/2, where f is the sensor footprint overlap fraction, Nx is the number of pixels along the long-axis of the camera detector array, and a is the field of view of each pixel. In the current embodiment Nx=128 and a=50 microradians and f is adjusted for different collection types (2).

The infinite line is intersected with the CU boundary to generate a line segment which defines the swipe and is stored as two longitude, latitude, altitude points (3).

At least two points indicating the end points are converted from geographic coordinates into the two mirror angles needed to aim at those coordinates. This conversion is described below (4).

The mirror-coordinates line segment is clipped to the physical mirror axes limits. The current embodiment uses the Liang Barsky line clipping algorithm. The mirror is moved to the beginning of the line and commanded to move at a constant angular speed along the line (5).

At the end of the line, a new swipe is defined as in step 2 (6).

The process continues until the next step would position the swipe line outside the bounding polygon (7).

In the scan controller, the mathematical equations for converting an aim point in world coordinates into mirror control voltages are described in Appendix A—Zion Model Equations and the process is shown in FIG. 15. The vector from the lidar to the target w and the vector u of the receiver (camera/sensor) line of sight incident on the scanner are used along with the Inverted Mirror Normal Equations to compute rotation angles for each mirror that will aim the receiver at the target. Before applying these equations, the target vector must be converted from world coordinates into mirror coordinates. This conversion uses the state of the lidar system measured by the Inertial Navigation System.

The most recent measurements from the INS are used in each calculation and the platform is propagated forward to the time at which the mirror commands expect to be used. When two or more target coordinates are converted to mirror commands, a line segment in geographic coordinates is converted to a line segment or curve in mirror coordinates.

The CU boundary is not converted to mirror coordinates for scanning math because the lidar platform is in constant motion and all the boundary points would have to be continually re-converted. The swipes are computed in the geographic coordinate system of the boundary points.

The physical mirror limits are not projected to geographic coordinates to clip the boundary or line segment. Projecting the straight edges of mirror limits into geographic coordinates makes straight lines become curved. Furthermore, the location and orientation of the mirror boundaries are continually changing and would need to be continually re-converted. This is not computationally efficient. Converting the geographic line segment into mirror coordinates does cause the line segment to be slightly curved. If the straight line approximation introduces too much error, multiple points along the geographic line can be converted to mirror coordinates to form a curve.

The swipes may be oriented in other directions relative to the aircraft motion to accommodate different mirror arrangements and capabilities. For instance, if a scanning system has an in-track axis that is more capable than the cross track, the system should make fast in-track swipes. The same process is used except the start point is either the point that is farthest left or farthest right and the swipe orientation is parallel to the platform heading.

The Scan Controller handles all the real-time computing involved in writing and updating mirror command data in the I/O device and keeping the buffers sufficiently stocked so that there are always valid mirror command values in the buffers. In one example, the values are being written to digital-to-analog-converters (DAC)s at 50 kHz per mirror axis. The Scan Controller also handles all the burst mode input from the I/O device that records the actual mirror positions via an analog-to-digital-converter (ADC) at 12.5 kHz per ADC channel.

Other methods for calculating the swipes that comprise a scan are possible, such as trajectories designed to manage the finite acceleration capability of the scanner, dithering one axis so as to broaden the effective swipe width and enable super-resolution imaging, or patterns designed to maximize the effects of speckle, and a stare mode at a geo-referenced point.

Method for Synchronization:

In order to accurately process range data into a 3D point cloud, the processing system must know precisely where the system was pointing when each range measurement was made. This involves precisely synchronizing data from the camera, INS, and mirrors. The camera and INS data are time-stamped with global positioning system (GPS)-locked nanoseconds in their respective devices. The present challenge is to align the analog position signals from the mirrors, recorded by the ADC in the I/O device, to a global positioning system (GPS) timestamp. Other systems accomplish this by using custom field-programmable-gate-array (FPGA) firmware or similar real-time signal processing system to apply a GPS timestamp to each measurement as it is received. By using a general purpose commercial-off-the-shelf (COTS) input/output (I/O) device and the following synchronization method, the current invention reduces system cost and development time.

The I/O device uses an FPGA with a reasonably stable internal clock to cycle through input channels (8 in the current embodiment), successively presenting each to an ADC for digitization. The synchronization problem entails determining the frequency of the internal clock (and how it changes over a recording time interval) and the absolute time (GPS time) of the first sample in a recording.

The I/O device is anchored to an inter-range-instrumentation-group (IRIG) timing card by a digital square wave signal output by the IRIG card at a stable rate (in the current embodiment a rate of 989 Hz is chosen). The rate must be high enough to accurately measure the FPGA clock on a time scale relevant to how fast it wanders, but slow enough to have many ADC samples recorded during a single period. Furthermore, the frequency is chosen so that the least common multiple of the square wave frequency and the ADC sampling frequency is large so as to avoid aliasing. For each rising edge of the square wave, the TRIG card produces a GPS timestamp that is picked up and recorded by the Scan Controller. We record the waveform as an analog signal in the same I/O device that is recording the mirror positions. In post-processing the rising edges of the square wave are identified with precision much better than the sampling period since a large number of square wave cycles can be averaged. In the current embodiment the sampling period is 80 microseconds. The phase uncertainty is enough so that the uncertainty of the position of the mirror, when moving at maximum angular speed, is less than the desired angular resolution of the lidar sensor. At typical angular rates of 10 radians/sec in the current embodiment, and angular resolution requirement of <20 microradians, the required timing uncertainty is <2 microseconds.

To establish reference points from which to derive absolute time, we commence the square wave (and the digital timestamps) a set time after recording starts, typically 2 seconds in the current embodiment. The delay is long enough so that the first rising edge can be uniquely detected. In a similar fashion, both the square wave and the stream of timestamps are turned off shortly before the end of the recording, so that the last rising edge is unambiguous in the analog data stream. This creates two distinct reference points in the data, allowing for reliable establishment of an absolute time reference. To post-process the analog data into rising edges, and match these to the digital timestamps, we determine sample indices for each of the rising edges. Assuming the sample rate of the I/O device is not changing appreciably over the course of a recording, we perform a least-squares linear fit of the rising edge indices to the TRIG timestamps. This yields a time offset for the beginning of the recording and a precise sample period for the I/O device. A higher-order polynomial or other function could be used for very long recordings during which the clock frequency might drift. With this information, we map every mirror sample to a precise GPS time, which can then be referenced to particular camera frames and specific INS data. Care is taken to offset in time forward and backward when assigning timestamps to other channels of the I/O device. The offset is easily calculated knowing the derived frequency of the clock internal to the I/O device.

Method for Collection Planning

User defines overall Region of Interest (ROI) in ground-based (e.g. latitude and longitude) coordinates.

Target-style collections are one or more user-specified collection units.

Corridor-style collections are defined as a path with one or more connected line segments; each section defined by a line segment can have a unique width.

Mapping-style collections are specified by a single large polygon

User defines collection requirements, e.g.

Point density in final data product, in points per square meter

Desired angular diversity

Constants associated with platform and sensor

Based on collection requirements, ROI is broken up into Collection Units (CUs)

CUs are chosen to have an area that can be scanned in a duration significantly shorter than the flyover time.

CUs are chosen to give a specified overlap for registration.

CUs fit within FOR of sensor.

For each CU

Fill CU area with a latitude and longitude grid of points

Use a pre-obtained DEM to interpolate an ellipsoid height for each grid point. This is the lowest elevation from which signals are expected. Alternatively, a lower envelope function can be defined.

Determine the highest elevation from which signals are expected for each grid point using an upper envelope specification. This upper envelope might be as simple as a copy of the DEM offset vertically by a constant, or a more complex surface that includes tall objects like antenna towers, bridges, and skyscrapers surrounded by lower objects like houses and trees.

Based on user input, simulate one or more flight paths to collect all CUs with required level of angular diversity. This simulation process may need to iterate to obtain optimal flight paths when surveying complex ROI shapes. The simulation includes calculating the projection of the sensor FOR onto the CU profiles.

For each CU and each overhead flight path, simulate operation of the lidar system at several points along the simulated flight path.

Estimate ratio of total photons emitted to photons detected. Choose output power setpoint so as to operate the camera at a desired signal level. This estimation process might include a map of the estimated reflectivity at a coarse scale across the CU.

Determine optimal focus setting based on minimum and maximum distance from platform to CU.

Based on minimum and maximum distance from platform to area or volume within CU, estimate appropriate maximum laser pulse repetition rate (PRF) that avoids occurrences of laser pulse transmission simultaneous with the camera being sensitive to faint ground signals.

Estimate swipe velocity required to meet minimum detection density.

Package collection information into a format for ingest into the scan queue. This mission planning process can be segmented into more granularity, depending on the ability of the sensor system to respond rapidly to commanded changes in laser output power, focus, camera settings, among others.

Scan Transitions

The scan mirror requires a non-zero time to transition from one scan to another scan. It is also better if this control is not an immediate step command, but instead a smooth curve to transition from one place to another and from one velocity to another. It is assumed that the two axis of the mirror operate independently so the problem only needs to consider one dimension at a time. The objective is to calculate a position and acceleration command that can cause a single axis of a scanning system to move from an initial position and velocity to a new desired position and velocity. Given a constant acceleration limit, a, and given an initial mirror position (A) and initial velocity (u) resulting from the end of one scan sequence and the desired mirror position (C) and velocity (w) representing the beginning of a new scan sequence, compute the fastest trajectory to command the mirror from the initial state to the desired state. This can be accomplished using two segments of constant acceleration. The second segment will use an acceleration of opposite sign from the first. There is a point of transition between the segments at transition location (B) and transition velocity (v). The mirror will move from A to B to C with corresponding velocities u, then v, then w at positions A, B, and C. Using two segments of constant acceleration results in two segments of linear velocity and parabolic positions. The duration of the first segment is $t_1$ and the duration of the second segment is $t_2$. The equations for these two segments are:

$$B = \frac{a}{2}t_1^2 + ut_1 + A \tag{1}$$

$$v = at_1 + u \tag{2}$$

$$C = -\frac{a}{2}t_2^2 + vt_2 + B \tag{3}$$

-continued $$w = -at_2 + v \qquad (4)$$

with unknown quantities are $t_1$, $t_2$, B, v. These four equations can be solved for the unknown quantities. The duration of the second segment $t_2$ in terms of known quantities is:

$$t_2 = \frac{\pm \sqrt{2}\sqrt{-2aA + 2aC + u^2 + w^2} - 2w}{2a} \qquad (5)$$

This equation has positive and negative forms as well as a positive and negative value for $\alpha$ which results in four potential solutions. Imaginary and negative time values are ignored. There are some cases which still have two or four valid solutions. These solutions are a signed $\alpha$ and a corresponding $t_2$. In this case, the acceleration and $t_2$ pairs are used to compute $t_1$ and the solution that minimizes the total time, $T=t_1+t_2$, is used. The equations for $t_1$ and the rest of the unknowns are as follows.

$$t_1 = \frac{w + at_2 - u}{a} \qquad (6)$$

$$v = a * t_1 + u \qquad (7)$$

$$B = \frac{a}{2}t_1^2 + ut_1 + A \qquad (8)$$

The two sequential parabolas are used to command the mirrors using the following equations:

$$p = \frac{a}{2}t^2 + ut + A \quad \ddot{p} = a \quad 0 \le t \le t_1 \qquad (9)$$

$$p = -\frac{a}{2}(t - t_1)^2 + v(t - t_1) + B \quad \ddot{p} = -a \quad t_1 < t \le t_2 \qquad (10)$$

Figure 16:
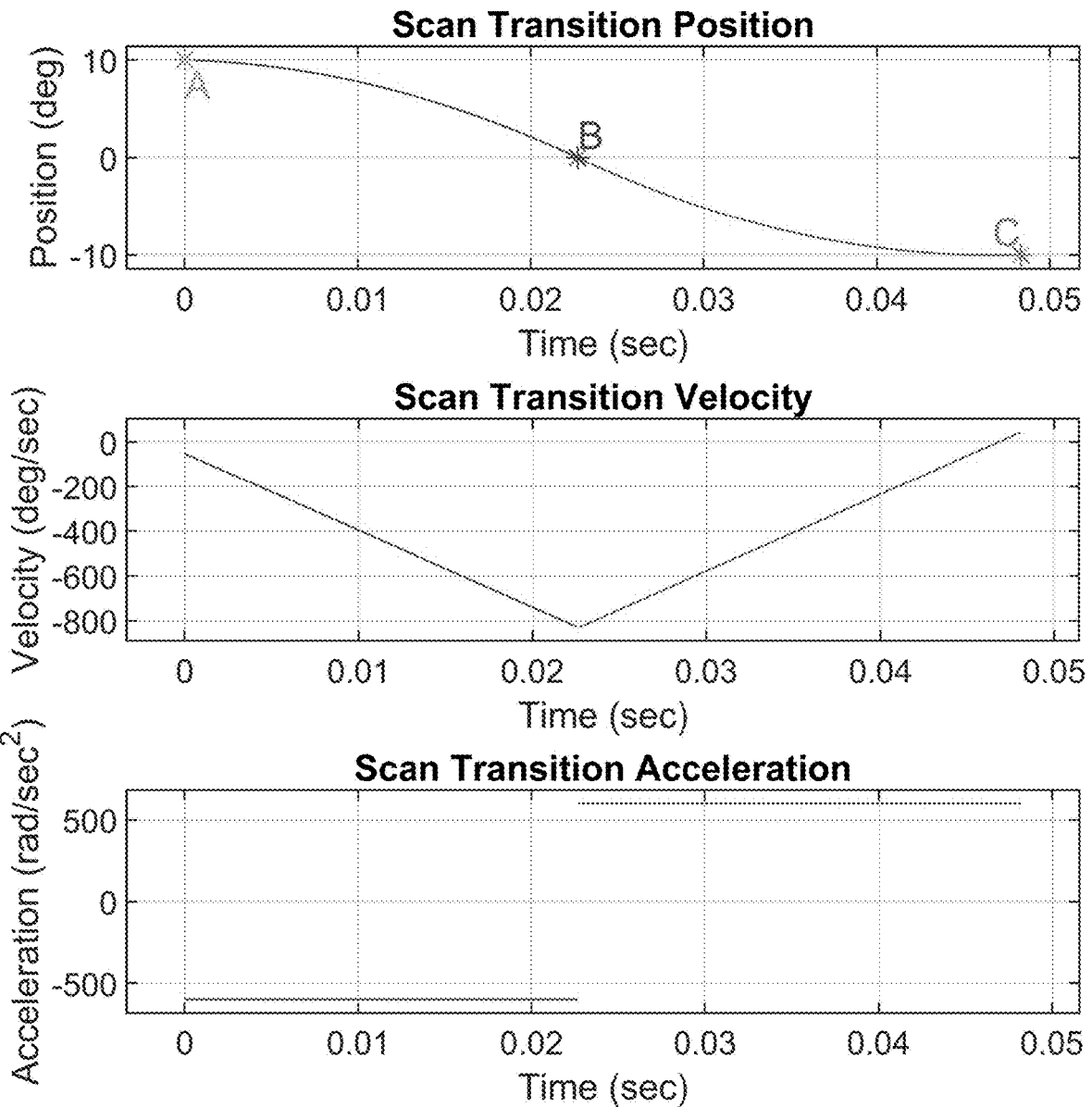
FIG. 16 depicts plots of a scan transition position, scan transition velocity and scan transition acceleration.

These equations for the scan transition position, scan transition velocity and scan transition acceleration are plotted for one example in FIG. 16. In this example the initial position is 10° and initial velocity is −50°/sec and the desired position is −10° and the desired velocity is 50°.

Alternate Embodiments

Some collection scenarios are best served by the airborne platform flying in an orbit. There are special considerations for the planning and execution of such a collection. First, the mission planner implements an upper limit on the scan duration. This ensures that each scan is collected from a well-defined angular position. If the scan system has a "fast" axis, with a higher maximum acceleration, and the platform moves too much during a scan, the scanning motion which was originally in the fast axis can transfer to the slow axis, causing problems with the scan. Second, in the current implementation, the scan controller operates the same in an orbit as it does during a linear collect: it finds the most aft point of the polygon and scans perpendicular to the heading of the platform at the start of the scan. This could be improved by projecting the position of the aircraft forward in time and scanning in the reference frame of the platform at the midpoint of the scan.

When planning the collection of a CU, choice of swipe overlap has an impact on the collection. Large swipe overlaps can give more uniform coverage in a situation where the illumination is not uniform (e.g. Gaussian). However, high swipe overlap is limited by the maximum acceleration of the mirror. Low swipe overlap is chosen if a short scan duration is desired, or scanning is limited by the maximum acceleration of the mirror.

The scan scheduler can be extended as part of a more complex airborne surveillance system. For example, the scheduler can adjust the scan parameters to maintain consistent image quality in response to the current signal level and/or the 3D image quality as assessed by a near-real-time processing system.

The scan scheduler is responsible for

Optimizing scheduling for achieving max angular diversity;

Making ad-hoc new collection units and modify the queue in response to scene content (water, foliage, parking lot, manmade structure, moving vehicles/objects);

Receiving cues from other sensors, such as radars, EO;

Using for chemical sensing or other optical sensors, including other lidars; Provide/refine targeting for other sensors.

The system can be operated with preference towards capturing static scenes (e.g. structures, trails, power lines) or dynamic scenes (e.g. moving people or vehicles), based on the choice of swipe velocity and swipe overlap. To optimize for static collection, choose swipe parameters to get enough points per scan to allow registration to work well at the desired output resolution for each scene. Each scan should have very good coverage of the first surface. The collection of scans should get enough angular diversity to mitigate shadowing and partial occlusion. To optimize for dynamic collection, choose faster swipe parameters to get just enough light to register, typically at a larger resolution than static, and revisit rapidly and regularly to track movement. Desired revisit rates are chosen to match the movement characteristics of the target in question and the expected number of interrogations to yield a high-confidence detection.

The concepts described in this document are easily extended to other platforms, such as ground, water, or space-based platforms. In ground or water-based systems, CUs defined in other coordinate systems such as platform-based angle-angle-range could be used to effectively image scenes or targets. This would facilitate exclusion of terrain or water from the scanning and allow easier targeting of fast-moving objects such as missiles or drones. For a space-based platform, multistatic pointing would likely be required, but the same scanning and planning concepts used for airborne platforms would apply.

Constructing a system with a rapidly-dithered axis in addition to one or more 'slow' axes would allow several new modes of operation. This would allow collection of larger widths of swipe and much more rapid revisit for tracking of moving objects. In addition, by dithering the scanning, a sensor could collect a much larger area in the aperture-clearing time associated with speckle of a rough surface. This could facilitate surface roughness estimation based on speckle statistics.

Figure 17:
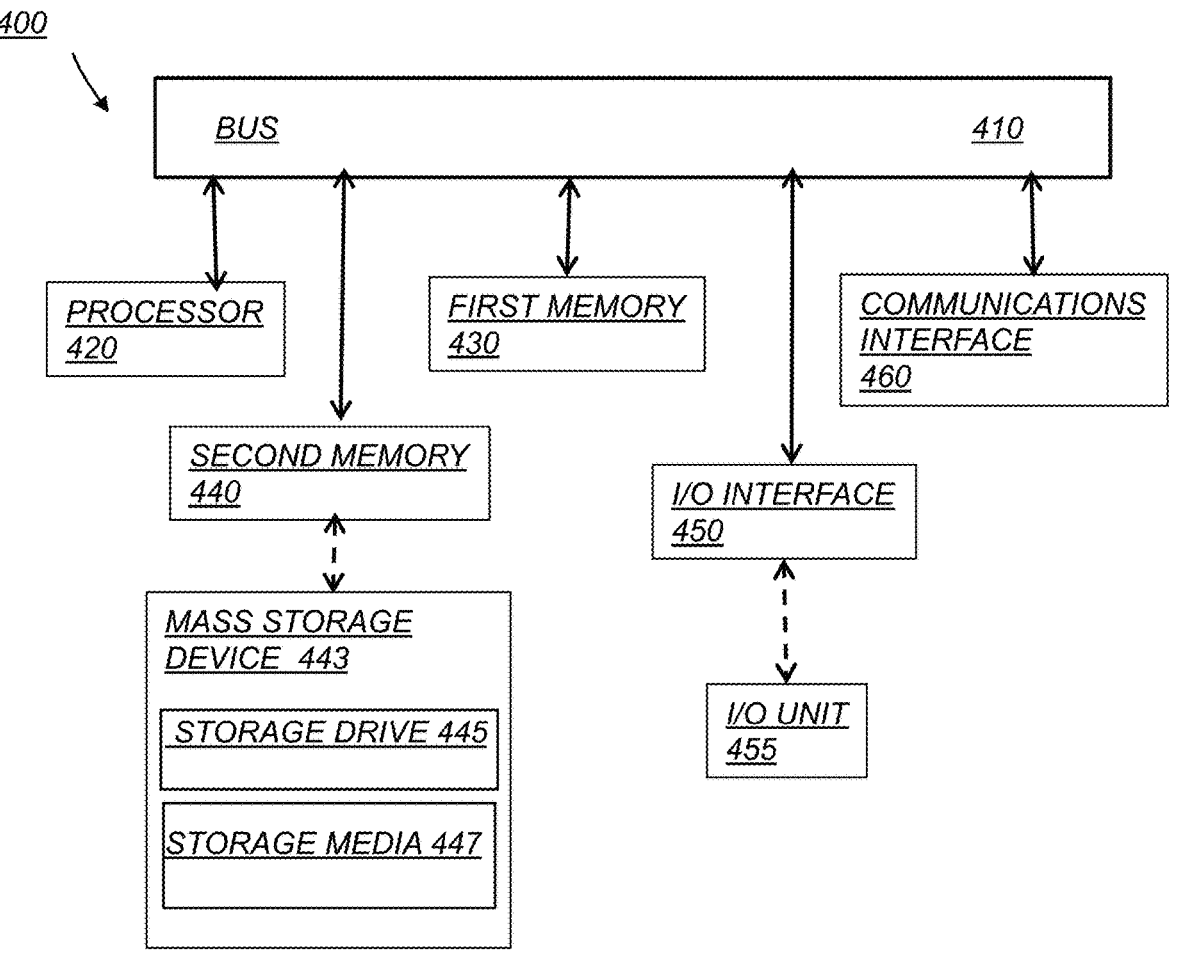
FIG. 17 is a block diagram of an exemplary computer system 400 or network architecture that may be used to implement the system of the present invention.

Referring to FIG. 17, an exemplary computer system 400 or network architecture that may be used to implement the system of the present invention includes a processor 420, first memory 430, second memory 440, I/O interface 450 and communications interface 460. All these computer components are connected via a bus 410. One or more processors 420 may be used. Processor 420 may be a special-purpose or a general-purpose processor. As shown in FIG. 16, bus 410 connects the processor 420 to various other components of the computer system 400. Bus 410 may also connect processor 420 to other components (not shown) such as, sensors, and servomechanisms. Bus 410 may also connect the processor 420 to other computer systems. Processor 420 can receive computer code via the bus 410. The term "computer code" includes applications, programs, instructions, signals, and/or data, among others. Processor 420 executes the computer code and may further send the computer code via the bus 410 to other computer systems. One or more computer systems 400 may be used to carry out the computer executable instructions of this invention.

Computer system 400 may further include one or more memories, such as first memory 430 and second memory 440. First memory 430, second memory 440, or a combination thereof function as a computer usable storage medium to store and/or access computer code. The first memory 430 and second memory 440 may be random access memory (RAM), read-only memory (ROM), a mass storage device, or any combination thereof. As shown in FIG. 16, one embodiment of second memory 440 is a mass storage device 443. The mass storage device 443 includes storage drive 445 and storage media 447. Storage media 447 may or may not be removable from the storage drive 445. Mass storage devices 443 with storage media 447 that are removable, otherwise referred to as removable storage media, allow computer code to be transferred to and/or from the computer system 400. Mass storage device 443 may be a Compact Disc Memory, ZIP storage device, tape storage device, magnetic storage device, optical storage device, Micro-Electro-Mechanical Systems ("MEMS"), nanotechnological storage device, floppy storage device, hard disk device, USB drive, among others. Mass storage device 443 may also be program cartridges and cartridge interfaces, removable memory chips (such as an EPROM, or PROM) and associated sockets.

The computer system 400 may further include other means for computer code to be loaded into or removed from the computer system 400, such as the input/output ("I/O") interface 450 and/or communications interface 460. Both the I/O interface 450 and the communications interface 460 allow computer code to be transferred between the computer system 400 and external devices or webservers including other computer systems. This transfer may be bi-directional or omni-direction to or from the computer system 400. Computer code transferred by the I/O interface 450 and the communications interface 460 are typically in the form of signals, which may be electronic, electromagnetic, optical, or other signals capable of being sent and/or received by the interfaces. These signals may be transmitted via a variety of modes including wire or cable, fiber optics, a phone line, a cellular phone link, infrared ("IR"), and radio frequency ("RF") link, among others.

The I/O interface 450 may be any connection, wired or wireless, that allows the transfer of computer code. In one example, I/O interface 450 includes an analog or digital audio connection, digital video interface ("DVI"), video graphics adapter ("VGA"), musical instrument digital interface ("MIDI"), parallel connection, PS/2 connection, serial connection, universal serial bus connection ("USB"), IEEE1394 connection, PCMCIA slot and card, among others. In certain embodiments the I/O interface connects to an I/O unit 455 such as a user interface, monitor, speaker, printer, touch screen display, among others. Communications interface 460 may also be used to transfer computer code to computer system 400. Communication interfaces include a modem, network interface (such as an Ethernet card), wired or wireless systems (such as Wi-Fi, Bluetooth, and IR), local area networks, wide area networks, and intranets, among others.

The invention is also directed to computer products, otherwise referred to as computer program products, to provide software that includes computer code to the computer system 400. Processor 420 executes the computer code in order to implement the methods of the present invention. In one example, the methods according to the present invention may be implemented using software that includes the computer code that is loaded into the computer system 400 using a memory 430, 440 such as the mass storage drive 443, or through an I/O interface 450, communications interface 460, or any other interface with the computer system 400. The computer code in conjunction with the computer system 400 may perform any one of, or any combination of, the steps of any of the methods presented herein. The methods according to the present invention may be also performed automatically or may be invoked by some form of manual intervention. The computer system 400, or network architecture, of FIG. 16 is provided only for purposes of illustration, such that the present invention is not limited to this specific embodiment.

Several embodiments of the present invention have been described. Nevertheless, it will be understood that various modifications may be made without departing from the spirit and scope of the invention. Accordingly, other embodiments are within the scope of the following claims.

What is claimed is:

1. A method for generating an image of a region of interest (ROI) from a flying aircraft comprising:

providing a light detection and ranging (lidar) system comprising a transmitter comprising a pulsed laser;

a receiver comprising a sensor to detect light scattered and reflected from the ROI;

an inertial navigation system;

a scanning system that uses a field-of-view (FOV) of the transmitter and receiver to interrogate a field-of-regard (FOR) during a flight over the ROI, wherein a FOV angle is narrower than a FOR angle;

a system control and a data processing computer comprising at least a memory storing computer-executable instructions of a software application and a processor coupled to the memory and configured to execute the computer-executable instructions; and wherein the software application comprises computer executable instructions that divide the ROI into collection unit (CU) areas, and for each CU determine area characteristics, estimate one or more flight paths required to collect CU area data, and determine settings of the sensor for collecting the CU area data;

wherein the scanning system comprises a first scanning mirror with a single axis of rotation and a second scanning mirror with a single axis of rotation and wherein the single axis of rotation of the first scanning mirror is non-parallel to the single axis of rotation of the second scanning mirror, and wherein the scanning system orients the lidar system in any direction inside the FOR;

wherein the lidar system further comprises a scan controller and wherein the scan controller determines positions of the first and second scanning mirrors and sends command voltages and receives readback voltages to and from an input/output (I/O) device, respectively, in blocks;

wherein the I/O device samples readback voltages indicating at least one of positions, velocities, and error signals of the first and second scanning mirrors at a sampling rate and saves the readback voltages in blocks and wherein the blocks of the readback voltages are provided to the system control and data processing computer at a lower rate than the sampling rate; and wherein the sampling rate is chosen based on an acceleration capability of the first or second scanning mirrors so that an angular error between the first or second scanning mirrors' actual position and a calculated position is less than a threshold value.

2. The method of claim 1, wherein the scanning system points the lidar toward any direction within the FOR by moving the first scanning mirror and the second scanning mirror by angles $m_1$ and $m_2$, respectively, and wherein the processor executes the computer executable instructions of the software application that calculate the angles $m_1$ and $m_2$ using:

$$m_1 = -\arctan\left(\frac{u_x + \sqrt{-w_x^2 + u_x^2 + 2u_y^2}}{w_x - u_y\sqrt{2}}\right)$$

$$m_2 = -\xi + \arctan\left(\frac{w_y + \sqrt{-u_z^2 + w_y^2 + w_z^2}}{u_z + w_z}\right)$$

wherein $u_x$, $u_y$, $u_z$ are coordinates of a vector of incoming line of sight of the sensor and $w_x$, $w_y$, $w_z$ are coordinates of a vector of outgoing line of sight; and wherein $\xi$ is the zero position angle of the second scanning mirror.

3. The method of claim 1, wherein the lidar system further comprises a scan queue that is loosely coupled to a scheduling application and tightly coupled to a scan controller and wherein the scan queue comprises an ordered data structure of the CU areas and for each CU area comprises at least one of a 3D-polygonal boundary in geographic coordinates, a number of times to image the CU area sequentially before choosing another CU area, a total number of times to image the CU area, a value of a swipe angular speed, and a minimum fraction of the CU's area that should be within the FOR in order for the CU area to be scanned.

4. A system for generating an image of a region of interest (ROI) from a flying aircraft comprising:

a light detection and ranging (lidar) system comprising:

a transmitter comprising a pulsed laser;

a receiver comprising a sensor to detect light scattered and reflected from the ROI;

an inertial navigation system;

a scanning system that uses a field-of-view (FOV) of the transmitter and receiver to interrogate a field-of-regard (FOR) during a flight over the ROI, wherein a FOV angle is narrower than a FOR angle;

a system control and a data processing computer comprising at least a memory storing computer-executable instructions of a software application and a processor coupled to the memory and configured to execute the computer-executable instructions; and wherein the software application comprises computer executable instructions that divide the ROI into collection unit (CU) areas, and for each CU determine area characteristics, estimate one or more flight paths required to collect CU area data, and determine settings of the sensor for collecting the CU area data;

wherein the scanning system comprises a first scanning mirror with a single axis of rotation and a second scanning mirror with a single axis of rotation and wherein the single axis of rotation of the first scanning mirror is non-parallel to the single axis of rotation of the second scanning mirror, and wherein the scanning system orients the lidar system in any direction inside the FOR;

wherein the lidar system further comprises a scan controller and wherein the scan controller determines positions of the first and second scanning mirrors and sends command voltages and receives readback voltages to and from an input/output (I/O) device, respectively, in blocks;

wherein the I/O device samples readback voltages indicating at least one of positions, velocities, and error signals of the first and second scanning mirrors at a sampling rate and saves the readback voltages in blocks and wherein the blocks of the readback voltages are provided to the system control and data processing computer at a lower rate than the sampling rate; and wherein the sampling rate is chosen based on an acceleration capability of the first or second scanning mirrors so that an angular error between the first or second scanning mirrors' actual position and a calculated position is less than a threshold value.

5. The system of claim 4, wherein the lidar system further comprises:

a scheduling application that runs in real time during the flight;

a scan controller; and a scan queue that is loosely coupled to the scheduling application and tightly coupled to the scan controller.

6. The system of claim 4, wherein the scanning system points the lidar system toward any direction within the FOR by moving the first scanning mirror and the second scanning mirror by angles $m_1$ and $m_2$, respectively, and wherein the processor executes the computer executable instructions of the software application that calculate the angles $m_1$ and $m_2$ using:

$$m_1 = -\arctan\left(\frac{u_x + \sqrt{-w_x^2 + u_x^2 + 2u_y^2}}{w_x - u_y\sqrt{2}}\right)$$

$$m_2 = -\xi + \arctan\left(\frac{w_y + \sqrt{-u_z^2 + w_y^2 + w_z^2}}{u_z + w_z}\right)$$

wherein $u_x$, $u_y$, $u_z$ are coordinates of a vector of incoming line of sight of the sensor and $w_x$, $w_y$, $w_z$ are coordinates of a vector of outgoing line of sight; and wherein $\xi$ is the zero position angle of the second scanning mirror.

7. The system of claim 4, wherein the I/O device receives and saves the blocks of command voltages from the scan controller and generates drive voltages for the first and second scanning mirrors one sample at a time at a fixed rate.

8. The system of claim 4, wherein the inertial navigation system is used for time synchronization between the first and second scanning mirror position data and data streams within the system via a time-stamped waveform recorded on a channel of a data acquisition system.

9. The system of claim 4, wherein the collection units comprise one of rectangles, polygonal areas, or 3D polygonal volumes.

10. The system of claim 4, wherein the area characteristics comprise at least one of terrain elevation profiles, lower envelope of a scene's height, upper envelope of a scene's height, spatial resolution, angular diversity, sampling density, or land cover.

11. The system of claim 4, wherein the settings of the sensor for collecting the CU area data comprise at least one of laser power, system photonic link, camera settings, swipe speed, or swipe overlap.

12. The system of claim 4, wherein the lidar system further comprises a scan queue that is loosely coupled to a scheduling application and tightly coupled to a scan controller and wherein the scan queue comprises an ordered data structure of the CU areas and for each CU area comprises at least one of a 3D-polygonal boundary in geographic coordinates, a number of times to image the CU area sequentially before choosing another CU area, a total number of times to image the CU area, a value of a swipe angular speed, and a minimum fraction of the CU's area that should be within the FOR in order for the CU area to be scanned.

13. The system of claim 5, wherein the scan controller is programmed to search the scan queue for a selected CU area that is in view and to send a command to the scanning system to scan the selected CU area for a selected number of scan times and to remove the selected CU area from the scan queue when the selected number of scan times is reached or to add the selected CU area back to the scan queue when the selected number of scan times is not reached.

14. The system of claim 4, wherein the scan controller calculates a specific motion of the first and second scanning mirrors for scanning a selected CU area by dividing the CU area into subsection areas (swipes) which are scanned with substantially uniform sampling density, next computing geographic coordinates of a longitude, a latitude, and an altitude, representing beginning and end points of each swipe, next calculating first and second scanning mirror commands to aim at the geographic coordinates, next moving the first and second scanning mirrors to the beginning point of the swipe and moving the first and second scanning mirrors at a substantially constant speed along the swipe and at the end point transitioning to a different swipe until the entire CU area has been scanned.

15. The system of claim 14, wherein the swipes comprise one of concentric arcs or substantially parallel lines.

\* \* \* \* \*